(12) United States Patent
Moenig et al.

(10) Patent No.: US 10,214,156 B2
(45) Date of Patent: Feb. 26, 2019

(54) REAR VIEW CAMERA SYSTEM FOR A MOTOR VEHICLE

(71) Applicants: Stefan Moenig, Schwelm (DE); Lothar Schemberg, Essen (DE); Sven Hild, Hagen (DE); Igor Gorenzweig, Wuppertal (DE); Christian Bresser, Leichlingen (DE)

(72) Inventors: Stefan Moenig, Schwelm (DE); Lothar Schemberg, Essen (DE); Sven Hild, Hagen (DE); Igor Gorenzweig, Wuppertal (DE); Christian Bresser, Leichlingen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 89 days.

(21) Appl. No.: 15/137,851

(22) Filed: Apr. 25, 2016

(65) Prior Publication Data

US 2016/0318456 A1 Nov. 3, 2016

(30) Foreign Application Priority Data

Apr. 30, 2015 (DE) .................. 10 2015 106 799
May 29, 2015 (DE) .................. 10 2015 108 544
(Continued)

(51) Int. Cl.
*H04N 7/18* (2006.01)
*B60R 11/04* (2006.01)
(Continued)

(52) U.S. Cl.
CPC .............. *B60R 11/04* (2013.01); *G06K 9/209* (2013.01); *B60R 2011/004* (2013.01);
(Continued)

(58) Field of Classification Search
CPC ....................................................... B60R 11/04
(Continued)

(56) References Cited

U.S. PATENT DOCUMENTS 3,586,773 A * 6/1971 Niemyer, Jr. .......... H04N 5/238
  348/366
3,909,121 A * 9/1975 de Mesquita Cardoso ..................
  G03B 37/02
  352/44
(Continued)

FOREIGN PATENT DOCUMENTS

EP         2 054 572 A1     5/2009

*Primary Examiner* — Leron Beck
(74) *Attorney, Agent, or Firm* — Fay Sharpe LLP

(57) ABSTRACT

A rear view camera system for a motor vehicle includes a movable carrier assembly, a camera optical system, which is movable with the carrier assembly, and a drive unit coupled with the camera optical system. The camera optical system is pivoted in relation to the carrier assembly about an adjustable axis which is rotatably coupled with the drive unit and can be moved about the adjustable axis between a rest position and a recording position. These can be adjusted depending on the surrounding areas to be recorded. An eccentric component is coupled in movable fashion with the adjustable axis. A rotation of the eccentric component changes the distance between the adjustable axis and the support element so that the camera optical system can be moved to a recording position in which the camera optical system protrudes from the recess of the carrier assembly.

30 Claims, 17 Drawing Sheets

(30) Foreign Application Priority Data

| Oct. 19, 2015 | (DE) | 10 2015 117 774 |
| Oct. 19, 2015 | (DE) | 10 2015 117 776 |
| Oct. 19, 2015 | (DE) | 10 2015 117 777 |

(51) Int. Cl.
- *G06K 9/20* (2006.01)
- *G06K 9/00* (2006.01)
- *B60R 11/00* (2006.01)

(52) U.S. Cl.
CPC ............... *B60R 2011/0092* (2013.01); *B60R 2011/0094* (2013.01); *G06K 9/00791* (2013.01)

(58) Field of Classification Search
USPC .......................................................... 348/837
See application file for complete search history.

(56) References Cited

U.S. PATENT DOCUMENTS

| 5,664,249 | A  | * | 9/1997  | Okuno    | G03B 17/02  |
|           |    |   |         |          | 396/538     |
| 6,483,542 | B1 | * | 11/2002 | Morinaga | H04N 5/2251 |
|           |    |   |         |          | 348/333.06  |
| 8,400,560 | B1 | * | 3/2013  | Yang     | B60R 11/04  |
|           |    |   |         |          | 348/148     |
| 8,830,317 | B2 |   | 9/2014  | Meier    |             |
| 9,457,733 | B2 | * | 10/2016 | Schutz   | B60R 11/04  |
| 2003/0133014 | A1 | * | 7/2003 | Mendoza | B60R 1/00 |
|              |    |   |        |         | 348/148   |
| 2004/0020270 | A1 | * | 2/2004 | Kuikka  | B08B 9/0433 |
|              |    |   |        |         | 73/49.5   |
| 2004/0105579 | A1 | * | 6/2004 | Ishii   | B60R 1/00 |
|              |    |   |        |         | 382/154   |
| 2005/0007665 | A1 | * | 1/2005 | Yoshimura | G02B 27/0006 |
|              |    |   |        |           | 359/512   |
| 2005/0146607 | A1 | * | 7/2005 | Linn    | B60R 1/00 |
|              |    |   |        |         | 348/148   |
| 2007/0132610 | A1 | * | 6/2007 | Guernalec | B60R 11/04 |
|              |    |   |        |           | 340/932.2 |
| 2009/0040300 | A1 |   | 2/2009 | Scribner |            |
| 2009/0110380 | A1 | * | 4/2009 | Fantone | G03B 17/08 |
|              |    |   |        |         | 396/27    |
| 2010/0158511 | A1 | * | 6/2010 | Zhang   | G03B 13/06 |
|              |    |   |        |         | 396/535   |
| 2010/0225738 | A1 | * | 9/2010 | Webster | B60R 11/04 |
|              |    |   |        |         | 348/36    |
| 2012/0195587 | A1 | * | 8/2012 | Hasuda  | G03B 17/14 |
|              |    |   |        |         | 396/532   |
| 2013/0128039 | A1 | * | 5/2013 | Meier   | B60R 11/04 |
|              |    |   |        |         | 348/143   |
| 2013/0258181 | A1 | * | 10/2013 | Leung  | H04N 5/2251 |
|              |    |   |         |        | 348/374   |
| 2015/0183380 | A1 | * | 7/2015 | Da Deppo | H04N 7/183 |
|              |    |   |        |          | 348/148   |
| 2016/0318456 | A1 | * | 11/2016 | Moenig | B60R 11/04 |

* cited by examiner

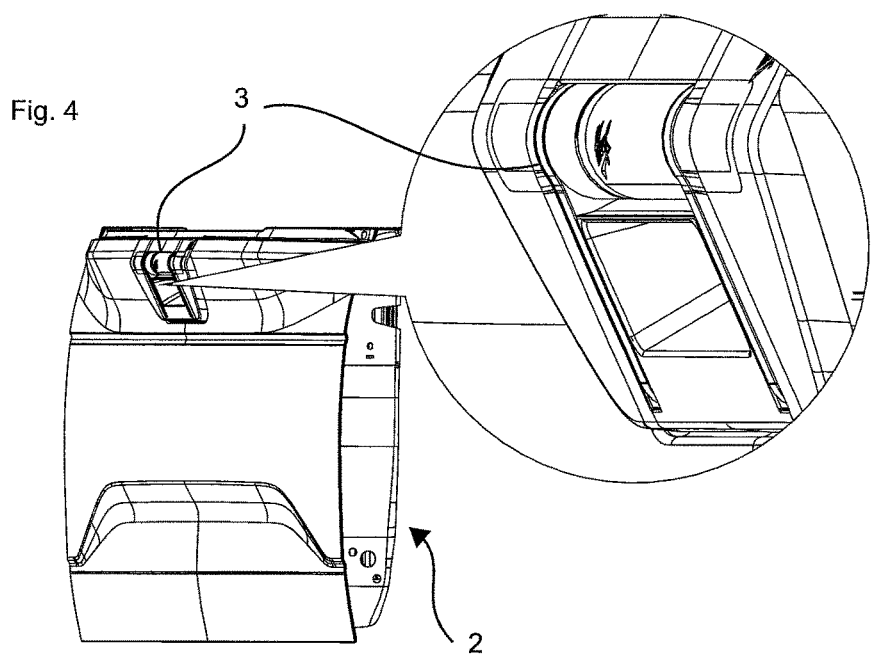
Fig. 4
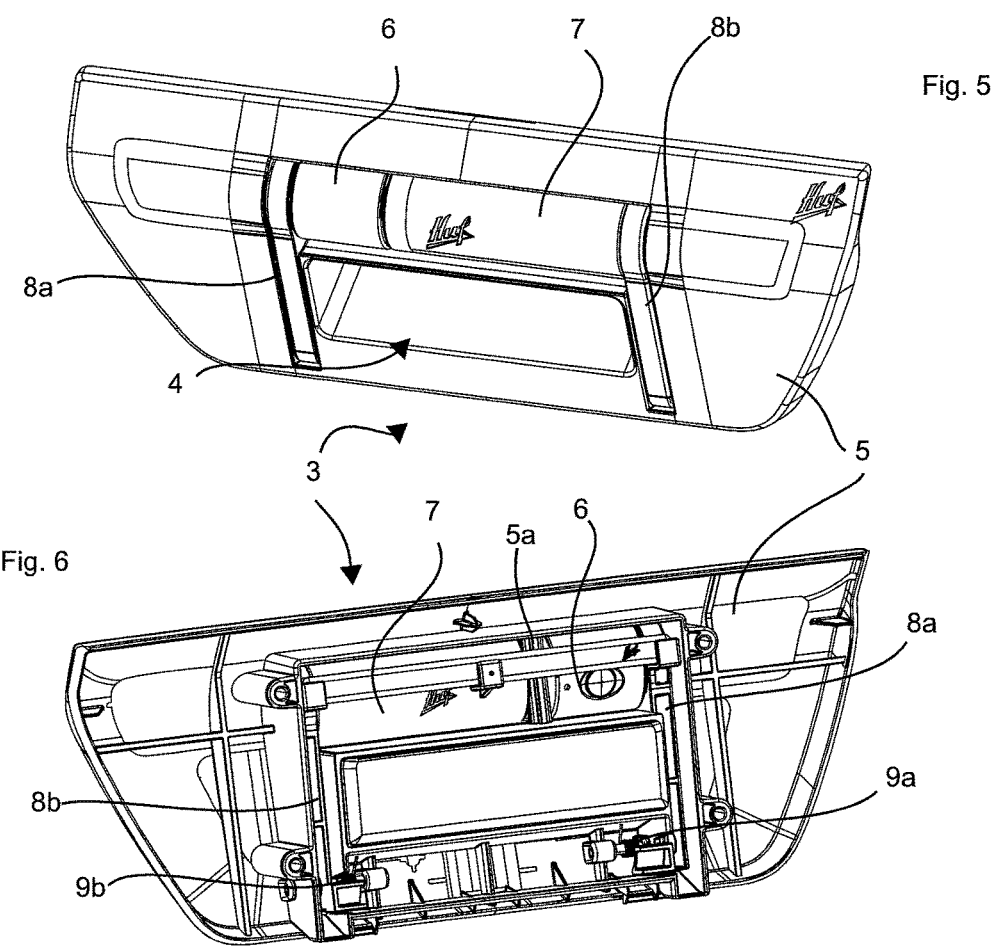
Fig. 5
Fig. 6

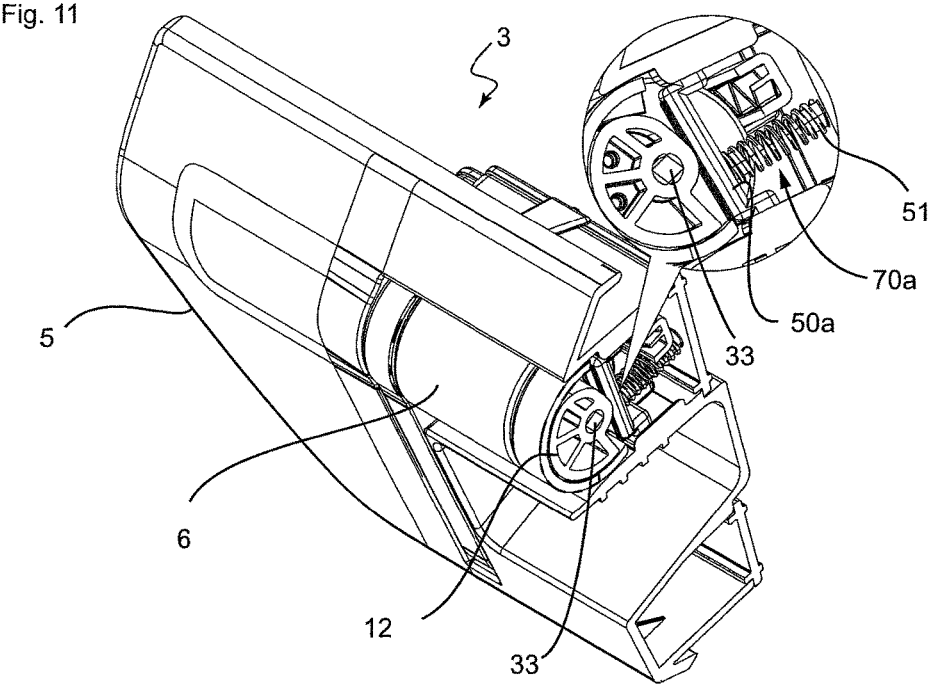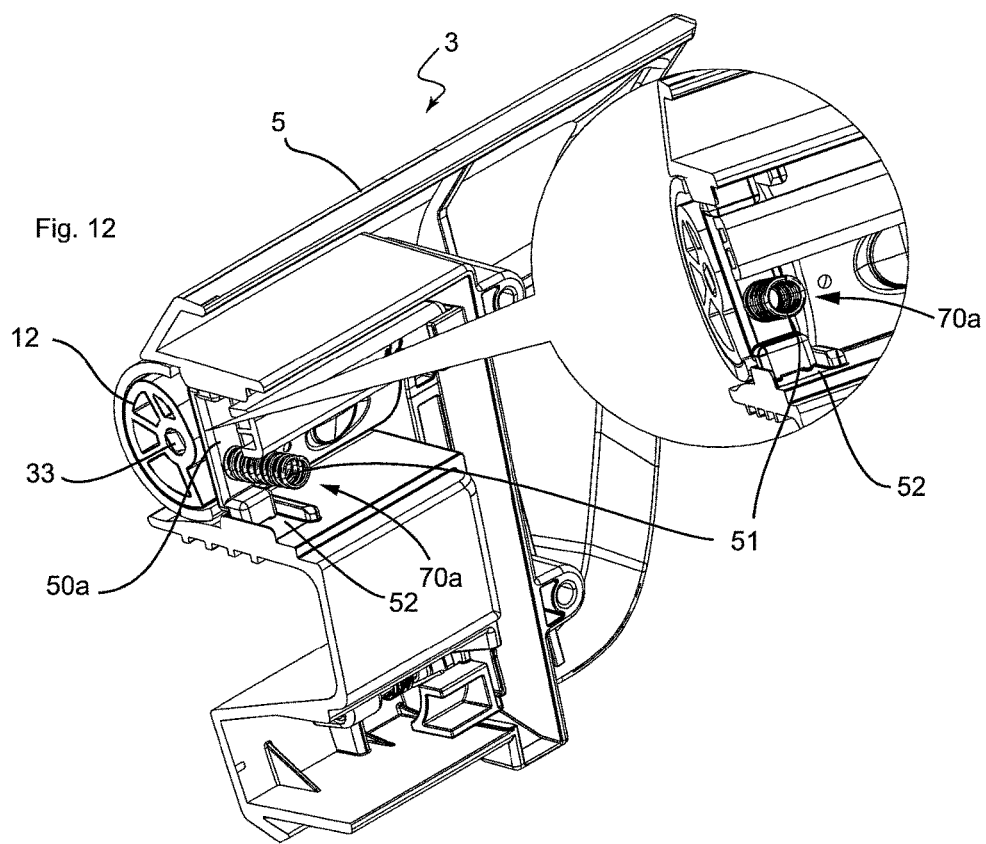

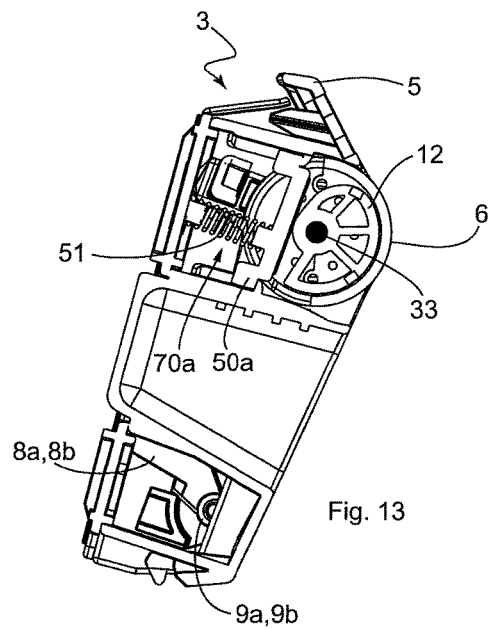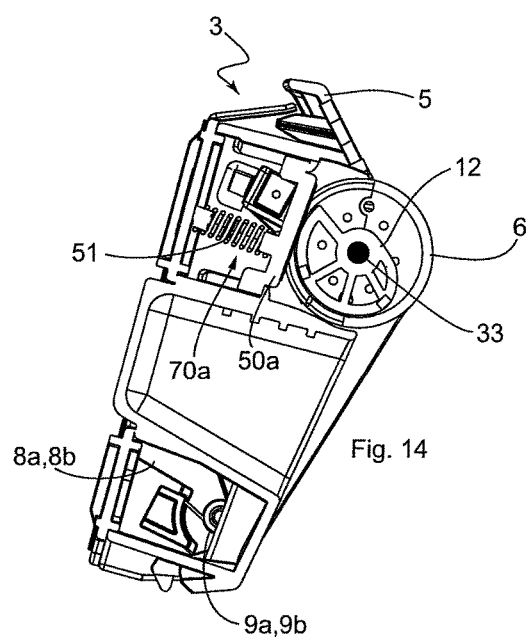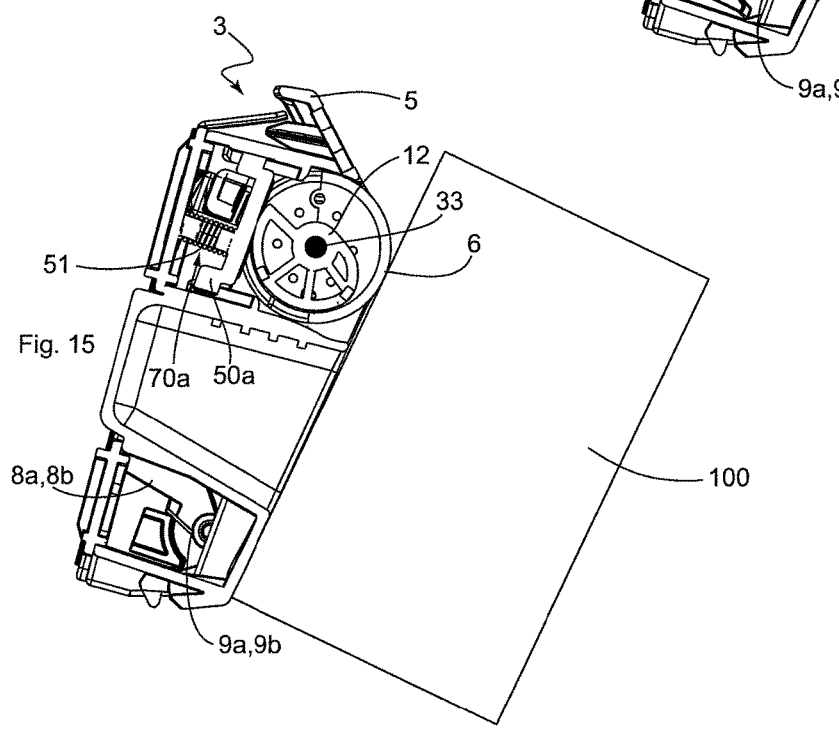

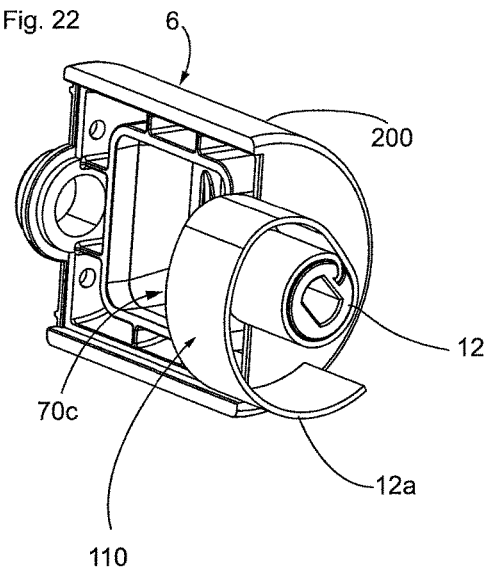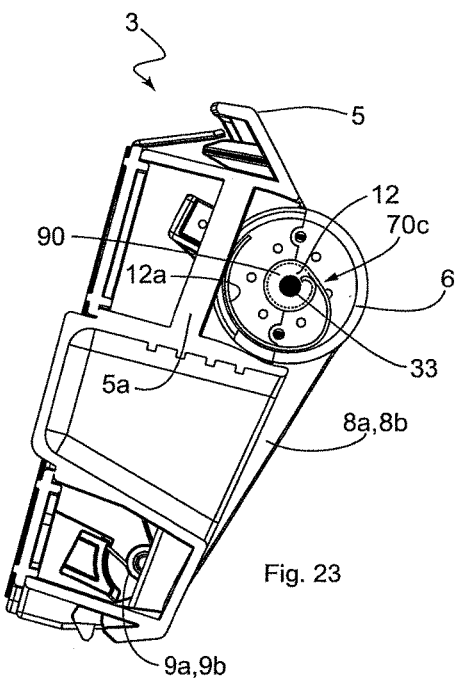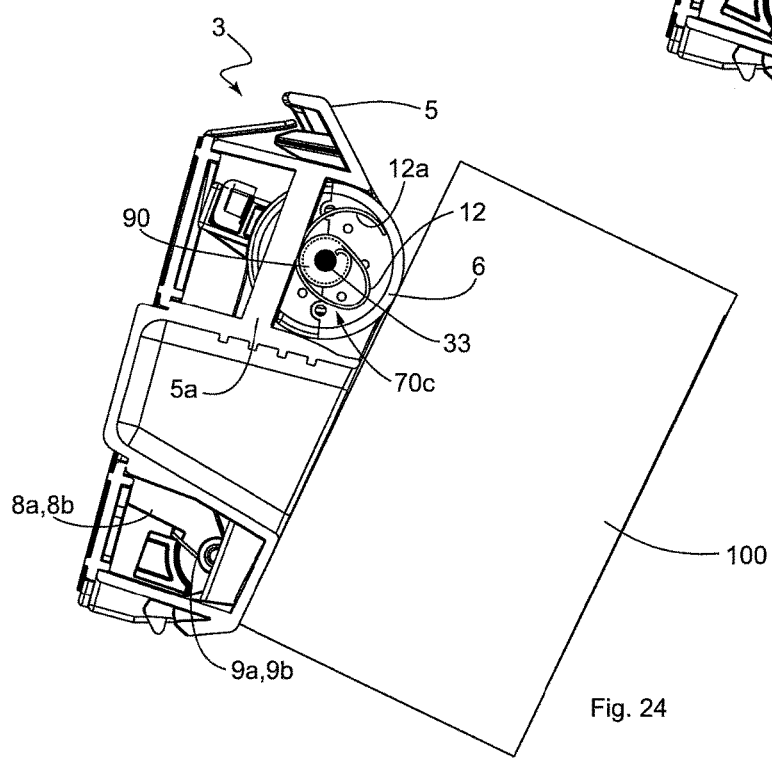

Fig. 32
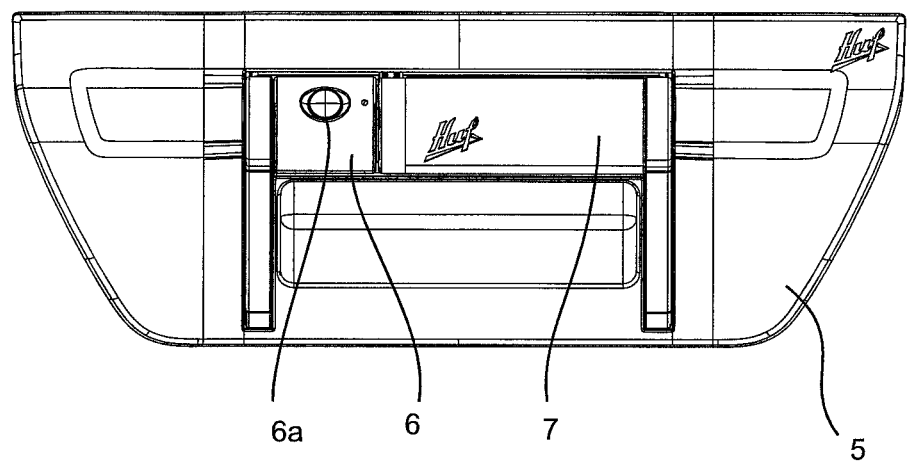
6a  6  7  5
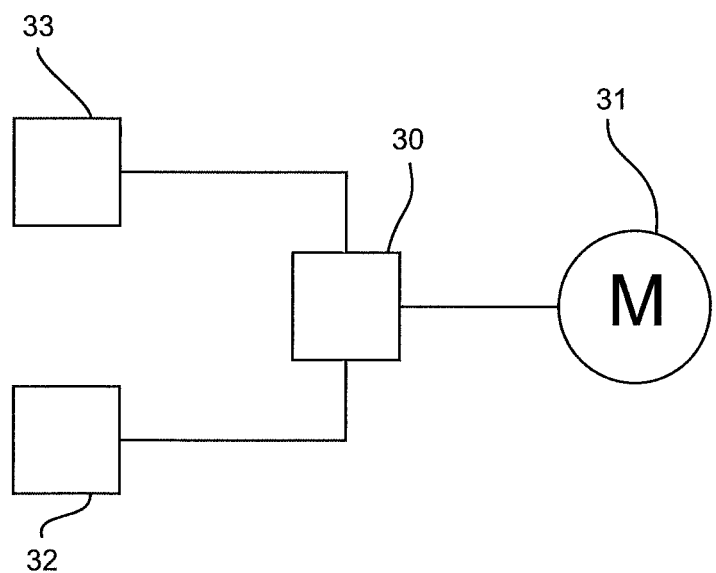
Fig. 33

REAR VIEW CAMERA SYSTEM FOR A MOTOR VEHICLE

BACKGROUND

The invention relates to a rear view camera system for a motor vehicle, comprising a carrier assembly which is arranged on a movable vehicle component of the motor vehicle, a camera optical system which is coupled in movable fashion with the carrier assembly and a drive unit which is coupled with the camera optical system, designed in such a way that the camera optical system can be moved to a rest position in which it is arranged in a recess of the carrier assembly, and to a recording position in which the camera optical system is able to record a surrounding area of the motor vehicle.

Furthermore, the invention relates to a rear view camera system for motor vehicles. Rear view cameras are used in motor vehicles to provide the driver with an improved view of the area behind the rear end of the motor vehicle. For this purpose, a monitoring device is provided in the driver's cabin of the vehicle and a camera is fixed at the rear section of the vehicle or arranged in such a way that it can be moved between a rest position and a recording position.

In addition, the invention relates to a camera system for a motor vehicle comprising a carrier housing, which is arranged on a movable vehicle component of the motor vehicle, and a camera module, which involves a drive unit and a camera unit with camera optical system, wherein the camera unit can be adjusted within a control range by means of the drive unit.

In general, camera systems and especially rear view cameras on motor vehicles are used for monitoring insufficiently visible areas in the immediate vicinity of the motor vehicle. In particular, camera systems are used to provide the driver with an improved view of the area behind the rear end of the motor vehicle. For this purpose, a monitoring device is provided in the driver's cabin of the vehicle, wherein a camera optical system is fixed at the rear section of the vehicle or arranged in such a way that it can be moved between a rest position and a recording position.

For example, a rear view camera system of the type mentioned above has been disclosed in EP 2 054 572. There the camera is retracted at times behind a vehicle emblem in a covered rest position and can be extended from this rest position to a recording position, wherein it performs a pivoting and translational movement. The camera or camera module of the type mentioned above has a camera optical system, which is coupled in movable fashion with a carrier assembly. The carrier assembly or carrier housing can be mounted in a recess of the car body. A drive unit is coupled with the camera optical system and with a control unit, so that the camera optical system can be adjusted or moved against the carrier assembly with the control of the control unit between a fixed rest position and a fixed recording position. In the above-mentioned example, the carrier assembly or carrier housing is arranged on a movable vehicle component of the motor vehicle, in particular the hatchback of the motor vehicle. When opening the hatchback, the carrier assembly together with the camera optical system is pivoted in relation to the remaining vehicle. Such a camera unit can be active not only when the motor vehicle is moved backwards but also for monitoring the traffic in the rear while driving forward, in order to initiate measures in the event of a rear-end collision, for example, tightening the seat belts. Such modern camera systems are continuously used when driving the motor vehicle. As a result, they are exposed to environmental influences and become soiled in the course of time, thus adversely affecting the reception of the camera optical system. Therefore, measures have been introduced in prior art in which a nozzle system is used for cleaning the camera optical system with water. Such a nozzle system for cleaning results in high production costs and involves the risk that in adverse weather conditions the use of water causes the camera unit to freeze. As a result, the movability of the camera unit is no longer ensured and, therefore, it cannot be used until the ice that had formed is thawed again. Even frost can possible damage the camera unit, which means that the use of water for cleaning the camera optical system is always considered to be critical. In addition, such nozzle systems require that an adequate amount of water is available, which would make it necessary to provide an additional container or to consider enlarging the available container which, in turn, would again increase production costs. Moreover, the driver would hardly want to deal with keeping the water level of an additional container under control, as well as having to refill it periodically.

Such cameras are also used with utility vehicles, especially vehicles with an open loading platform. For example, document US 2009/0040300 describes a camera arrangement for monitoring the rear section of a utility vehicle and the area of the trailer hitch. However, the camera arrangement sticks out from the back of the vehicle and, because of its position, it is exposed to the danger of being damaged when the driver hits an obstacle while driving in reverse.

Furthermore, document U.S. Pat. No. 8,830,317 discloses a camera which is arranged at the tailboard of a pickup truck. In such arrangements, the camera is pivoted when the tailboard is opened and, therefore, records different areas of the environment. This document discloses that the camera has multiple different visual fields which are activated, depending on the condition of the tailboard (open or closed), without moving the camera.

Based on this prior art, the invention has the objective of providing in a structurally simple and cost-effective manner an improved rear view camera system for a motor vehicle, which avoids the problems known from prior art and which can record a large surrounding area in the most variable manner.

BRIEF SUMMARY

According to the invention, in a rear view camera system of the type mentioned above, the problem is solved in that the camera optical system is pivoted in relation to the carrier assembly about an adjustable axis, which is coupled with the drive unit, and by means of rotation it can be moved about the adjustable axis between rest position and recording position, which can be adjusted in variable manner, depending on the surrounding areas to be recorded, and in that an eccentric component is coupled in movable fashion with the adjustable axis, which eccentric component is supported on a support element of the carrier assembly, so that a rotation of the eccentric component changes the distance between the adjustable axis and the support element in such a way that the camera optical system can be moved to recording position, in which the camera optical system protrudes from the recess of the carrier assembly.

By means of the invention, a rear view camera system is provided which is characterized by a functional construction and which has a simple and cost-effective structure. Because of the fact that the movement of the camera optical system from rest position to a recording position involves a rotation about the adjustable axis, the invention-based rear view camera system has a compact structure and requires merely a small mounting space, especially because no long extension paths are needed to activate the camera optical system and move it from rest position to recording position. According to the present invention, the rear view camera system allows the camera optical system to be adjusted in different directions, because different rotation angles about the adjustable axis allow for different surrounding areas to be recorded, so that the driver can record desired surrounding areas by determining the rotation angle. In addition, the camera can be quickly and easily rotated back to rest position, where it is protected and shielded in the carrier assembly from the surrounding area. According to the invention, the eccentric component has the purpose of further enlarging the visual range. It results in the extension or exposure movement of the adjustable axis, thus moving the camera optical system out of the carrier assembly, which increases the variability of recording the surrounding area, as well as the recording range.

When during a recording position the camera optical system protrudes from the recess of the carrier assembly, there is the danger that the camera optical system is damaged, especially when the camera optical system is mounted on the tailboard of a pickup truck, which is exposed to tough and harsh handling. The pickup trucks in question predominantly involve utility vehicles which drive around with closed, as well as opened tailboard, and with which it is possible that the tailboard when opened comes to rest on an obstacle or the tailboard when driving in reverse hits an obstacle. To protect the camera optical system, which in the cases mentioned above protrudes from the tailboard, an embodiment of the invention provides an impact protection, which allows the camera optical system to perform an evasive movement from the recording position, in which the camera optical system protrudes from the recess, back into the recess of the carrier assembly, wherein the evasive movement is performed against an evasive force exerted by the impact protection. As a result, the camera optical system can be retracted back into the recess of the carrier assembly when a correspondingly high force impacts the camera optical system from the outside, which would involve the danger of the camera optical system to be damaged.

It is especially practical that the camera optical system is spring-mounted via the impact protection to the carrier assembly. The spring-mounted attachment allows the camera optical system to be flexibly reset into the recess of the carrier assembly, in order to protect the camera optical system from damage, and subsequently adjusted to the exposed or extended recording position when the impact on the camera optical system is eliminated and the camera optical system returns to recording the desired surrounding area in its extended recording position in relation to the carrier assembly.

According to a first embodiment of the impact protection, the invention provides that the support element has a bar-like design and the impact protection is designed in the form of an elastic pressure spring, wherein the bar-like support element, which is supported at the elastic pressure spring as attachment for the eccentric component, can be shifted against the evasive force of the elastic pressure spring in relation to the carrier assembly in such a way that the camera optical system can be moved into the recess of the carrier assembly. The support element for the eccentric component, which allows the camera optical system to be extended or exposed from the recess, is spring-mounted at the carrier assembly and, therefore, it is able to yield when a force is exerted on the camera optical system (for example, when impacting an obstacle), so that the camera optical system can be moved back into the recess of the carrier assembly.

To monitor the motion control of the support element in the first embodiment of the impact protection, the invention also provides that the bar-like support element is incorporated in a guide of the carrier assembly in which the bar-like support element can be retained and shifted by means of the pressure spring.

According to the present invention, a second embodiment of an impact protection provides that the support element has a bar-like and elastically deformable design and acts as impact protection, wherein the eccentric component can be shifted against the evasive force of the elastically deformable support element in relation to the carrier assembly in such a way that, under the elastic deformation of the support element, the camera optical system can be moved into the recess of the carrier assembly. Like an elastic pressure spring, the elastically deformable support element also yields when a force that could result in damage is exerted on the camera optical system. Because of the elastic yielding of the support element, the eccentric component and thus the camera optical system, both of which are attached at the adjustable axis, can be moved back into the recess of the carrier assembly and remain there until the camera optical system is no longer exposed to any external force.

The first and second embodiment of the impact protection are conceptionally characterized in that the support element is elastically coupled with the carrier assembly, so that the support element can be moved and/or elastically deformed in relation to the carrier assembly by overcoming the evasive force.

In a third embodiment of the invention-based impact protection, it is of advantage when the eccentric component has at least one elastically deformable outer peripheral region, wherein the eccentric component involves the impact protection and can be shifted in relation to the carrier assembly in such a way that, under elastic deformation of the at least one elastically deformable outer peripheral region, the camera optical system can be moved into the recess of the carrier assembly. Consequently, in the third embodiment, it is no longer the support element which allows for the spring-mounted design of the camera optical system, but it is the eccentric component, which evades a force exerted on the camera optical system from the outside and allows the camera optical system to return into the recess of the carrier assembly.

An especially easy installation is possible when in the third embodiment the eccentric component is designed in the form of a plastic component, forming one piece with the camera housing, thus reducing the number of components.

As an alternative to the integral design, the invention provides that the impact protection has a two-part design, consisting of a metal spring element and the housing of the camera optical system, wherein the spring element is attached to the housing of the camera optical system and has an outer peripheral region, which is supported on the support element of the carrier assembly when the camera optical system is moved to recording position.

A further embodiment of the invention provides that the adjustable axis is coupled with the carrier assembly via at least one swivel arm, wherein by means of the adjustable axis and the at least one swivel arm the camera optical system can be pivoted in relation to the carrier assembly to recording position, in which the camera optical system protrudes from the recess of the carrier assembly. The adjustable axis extends through a swivel arm of the carrier assembly and can be moved together with the swivel arm in relation to the carrier assembly. In this embodiment of the invention, the carrier assembly is mounted to the movable vehicle component, for example, the tailboard. A swivel arm forms part of the carrier assembly, and this swivel arm can be pivoted in relation to the portion of the carrier assembly fixed at the vehicle. The camera optical system is arranged rotatably at the swivel arm, allowing for both a pivoting movement and rotary motion of the camera optical system. Coupling the camera optical system with the carrier assembly via a swivel arm has the special advantage that it allows for a second form of movement of the camera optical system in relation to the carrier assembly in that the swivel arm is moved out in relation to the carrier assembly. For example, the camera optical system can rest in an inactive condition in the carrier assembly in movable vehicle components and when a recording session is desired, it is possible via the swivel arm to move it partially away from the outer wall of the carrier assembly and the supporting component, in order to capture a larger visual field in the rear section of the vehicle. In addition, the camera can be rotated to be optimally set, depending on the position of the supporting component.

In a further embodiment of the invention, it is especially preferred that the at least one swivel arm is pretensioned with elastic resetting means against the carrier assembly in such a way that the at least one swivel arm and the camera optical system can be lowered into a recess of the carrier assembly. In other words, the at least one swivel arm, with which the camera optical system can be pivoted in relation to the carrier assembly, has elastic resetting means. By means of these elastic resetting means, the swivel arm is braced against the carrier assembly in such a way that the swivel arm together with the camera optical system are pushed into abutment with the carrier assembly and into a recess of the carrier assembly. The tensioning and resetting means have the purpose of resetting the swivel arm with the camera optical system into a rest position within a recording range of the carrier assembly. The process of moving out of this position has to be performed against the clamping effect, for example, by means of a drive unit.

A further embodiment of the invention provides that the evasive force of the impact protection is greater than the resetting force of the elastic resetting means of the at least one swivel arm. In this way, it is ensured that the eccentric component can be supported, as long as no force greater than the evasive force is exerted on the camera unit. If the evasive force is smaller than the resetting force, the space between the adjustable axis and the support element could not be enlarged when the eccentric component is supported on the support element, which means that the camera optical system would not be extended from the recess because the resetting force is effective and would pull the camera optical system back into the recess.

Finally, a further embodiment of the invention provides that an electric rotating motor with a shaft is also arranged in the adjustable axis as a component of the drive unit of the camera optical system, wherein the shaft of the rotating motor is located in the adjustable axis of the camera optical system, and the rotating motor together with the camera optical system can be pivoted via the at least one swivel arm out of the recess of the carrier assembly to the second recording position and back. In this case, the rotating motor can be arranged in the vicinity of the camera optical system and can have an especially compact design. Together with the swivel arm, the rotating motor is pivoted away from the carrier assembly and actuates the camera. When, in this context, we are talking about a drive unit, this term involves also drive units having a transmission, so that the rotary motion of a motor impacts the camera optical system in a transmission ratio. As a result, the rotary motor is used for rotating the camera, as well as pivoting the swivel arm. For the purpose of pivoting, in addition to the camera optical system, the eccentric component is also coupled with the motor shaft, which is supported on a support element of the carrier assembly. Depending on the rotation angle of the eccentric component, the adjustable axis moves away from the support element, and the swivel arm together with the camera optical system and the motor is pushed against the resetting force away from the carrier assembly.

According to the preceding description, the rear view camera system described above is characterized in that it can occupy different recording positions, making the recording range variable. In particular, the camera optical system is coupled in movable fashion with a carrier assembly, which is used for installing the entire rear view camera system at a motor vehicle. The carrier assembly is moved together with the movable vehicle component. For example, when attaching the carrier assembly at the hatchback of a motor vehicle, the carrier assembly is rotated together with the hatchback. When the camera system is arranged at the tailboard of a pickup truck, the carrier assembly is also pivoted together with the tailboard in relation to the remaining vehicle. In contrast to the cameras known from prior art, the camera optical system has multiple recording positions. The recording positions have to be distinguished from any rest positions, in which the camera is received, for example, in covered fashion, in a protected area. At the same time, the position of the movable vehicle component can be determined by means of a position detecting device, in order to move the camera to recording position based on the position information of the movable vehicle component, which is necessary in order to set the camera to the desired recording range in correspondence to the position of the vehicle component. Therefore, depending on the position or condition of the vehicle component, for example, the hatchback or tailboard of the vehicle, it is possible to perform an alignment of the camera. This serves the purpose of adjusting the visual range of a camera system attached at the movable component as best as possible to the position of the component. It is possible to set the camera optical system subject to the position information, which takes place by controlling the drive unit on the basis of the position information. In this way, it is possible to ensure that the position of the camera optical system is controlled in an optimal manner by means of the drive unit for examining the back area of the motor vehicle.

The special invention-based embodiment, according to which the camera optical system is designed to rotate about the adjustable axis, is based on the knowledge that on a vehicle movable vehicle components, in particular doors and flaps, perform on a regular basis a pivoting movement about a pivoting axis in relation to the vehicle. A rotary motion or rotational movement of the camera is able to compensate effectively such a pivoting movement of the movable vehicle components. Since a pivoting movement always involves a rotational part, even at a distance from the pivoting axis, this rotational part can be compensated with a rotary motion of the camera optical system, so that even when the supporting component is pivoted the camera optical system can be brought back to proper alignment by means of rotation.

Furthermore, it is the objective of the invention to provide an improved camera system for vehicles in which the adverse effect is reduced by means of a movement or adjustment of the component supporting the camera.

This problem is solved by means of a rear view camera system with the characteristics of Claim 14. Compared to prior art, the invention-based rear view camera system according to Claim 14 is first of all characterized in that within the adjustment range the camera optical system has at least two recording positions, in which the camera captures recordings from its respective visual field outside the vehicle. The camera optical system is coupled in movable fashion with a carrier assembly. The carrier assembly is used for mounting the entire rear view camera system at a vehicle. The carrier assembly is moved together with the movable vehicle component. For example, when mounting the carrier assembly at the hatchback of a vehicle, the carrier assembly is pivoted together with the hatchback. When the camera system is mounted at the tailboard of a pickup truck, the carrier assembly is also pivoted together with the tailboard in relation to the remaining vehicle. Compared with the cameras known from prior art, the camera optical system has multiple recording positions. The recording positions have to be distinguished from possible rest positions, in which the camera is camera optical systemed, for example, in covered fashion, in a protected area. According to the invention, at least two positions of the camera can be set by means of a control unit and the associated drive unit, in which the camera optical system can take pictures from the surrounding area. According to the invention, the camera optical system also includes a position detecting device which captures the position of the movable vehicle component. The position detecting device has at least the ability of determining two different positions of the movable vehicle component, i.e., for example, the hatchback or tailboard. For this purpose, it is possible to arrange at a distance from the camera system, for example, a micro switch device, or any other sensor or switch, for example, a Hall sensor, by means of which it is possible to determine the opening or closing process of the flap. As subsequently described, it is also possible to implement a position detecting device directly in the rear view camera system, for example, in the form of a position sensor. The important point is that a device supplies a position signal, which is supplied to the control unit of the drive unit. Depending on this position signal, the control unit actuates the drive unit to approach an associated position of the camera optical system. According to the invention, a camera alignment is performed, depending on the position or condition of the vehicle component, for example, the hatchback or tailboard of the vehicle. This serves the purpose of adjusting as best as possible the visual range of a camera system mounted at a movable component to the position of the component. For this purpose, the control unit stored an allocation of the position information to the control information of the camera. Depending on whether the position detecting device is implemented by means of a control unit with direct switching states or a continuous position detecting device like, for example, in a position sensor, the camera optical system can be actuated discreetly or with precise coordination. It is important that the camera optical system is set based on the position information, which takes place by actuating the drive unit, depending on the position information. The method of actuating the drive unit and movement path of the camera optical system can be different.

For example, using an appropriate swivel drive, the camera can perform a pivoting movement in relation to the movable vehicle component and the carrier assembly. It is also possible to couple pivotal, rotary and translational movements, which is possible, for example, by means of respective bars or guide mechanisms. Appropriate adjusting devices are known from prior art.

In an embodiment of the invention-based rear view camera system according to Claim 14, the position detecting device is designed in the form of a micro switch or Hall sensor, which monitors the position of the movable vehicle component. Often, vehicles already have control units which determine the opening or closing processes of the flap of a vehicle. In some vehicle types, for example, in connection with the tailboards of pickup trucks, this information can be used to generate the position signal for the control unit. The tailboard of a pickup truck presents a special situation in that pickup trucks can be operated also with a lowered tailboard, for example, for transporting longer loads. Frequently, these vehicles are maneuvered with a lowered flap in order to perform loading processes. When the camera is mounted to the tailboard in a traditional manner, the visual field of the camera would be moved downward and would record an area which does not correspond to the relevant area behind the rear end of the vehicle. According to the invention, in this embodiment the information of an opened tailboard is used to move the camera to a second position in which the camera monitors the area behind the vehicle even with a lowered tailboard. A micro switch in the region of the locking mechanism of the tailboard can provide the respective position signal.

In a preferred further development of the invention according to Claim 14, a position sensor is arranged in the carrier assembly, which monitors the position of the carrier assembly.

In technology, different types of position detecting devices are known, for example, acceleration sensors and/or sensors operated by means of a gyroscope. When such a sensor is integrated in the rear view camera system and especially in the carrier assembly, the carrier assembly as such forms a structure that is independent from the remaining structure of the vehicle. As a result, the position signal does not have to be transmitted from a distant place. Appropriate acceleration sensors or position detecting sensors are available on the market, in particular they are used in cellular phones for detecting the position.

Such a sensor usually does not only supply discreet position information but changes its signal depending on the position virtually continuously with the position change of the carrier assembly. Not only in end positions, but also at an inclined position of the respective vehicle component at which the carrier assembly is mounted an associated camera position can be approached. Therefore, it is possible to establish an association or functional connection between the position of the camera optical system actuated by the control unit and the information of the position sensor. In this way, it is always ensured that the position of the camera optical system is controlled in an optimal manner by means of the drive unit for examining the back area of the motor vehicle.

In an especially preferred embodiment of the invention according to Claim 14, the camera optical system is arranged in the carrier assembly in such a way that the camera optical system is pivoted in relation to the carrier assembly.

This special embodiment of the invention is based on the knowledge that movable vehicle components on a vehicle, especially doors or flaps, perform on a regular basis a pivoting movement about a pivoting axis in relation to the vehicle. A rotary motion of the camera is able to compensate effectively such a pivoting movement of the supporting component. Since a swiveling process has a rotational part even at a distance from the pivoting axis, this rotational part can be compensated with a rotary motion of the camera, so that even when the supporting component is pivoted the camera can be brought back to proper alignment by means of rotation.

In an especially preferred embodiment of the invention according to Claim 14, the camera is rotated about an adjustable axis, wherein the adjustable axis extends through a swivel arm of the carrier assembly. The adjustable axis and the swivel arm can be rotated in relation to the carrier assembly.

In this embodiment of the invention, the carrier assembly is mounted at the supporting movable vehicle component, for example, the tailboard. A swivel arm form part of the carrier assembly and this swivel arm can be pivoted in relation to the part of the carrier assembly mounted at the vehicle. The camera optical system is arranged rotatably at the swivel arm, which allows for a pivoting movement of the camera, as well as a rotary motion of the camera.

The fact that the camera optical system is coupled with the carrier assembly via a swivel arm is especially advantageous because in this way it is possible temporarily to deflect the camera optical system in relation to the carrier assembly by moving the swivel arm in relation to the carrier assembly. For example, the camera optical system can rest in an inactive condition in the carrier assembly mounted at movable vehicle components, and when a recording is desired, it is possible via the swivel arm to move it partially away from the outer wall of the carrier assembly and the supporting component, in order to capture a larger visual field in the rear section of the vehicle. In addition, the camera can be rotated to be optimally set, depending on the position of the supporting component.

It is especially preferred when the at least one swivel arm, with which the camera optical system can be moved in relation to the carrier assembly, has elastic resetting means. With these elastic resetting means, the swivel arm is pretensioned against the carrier assembly in such a way that the swivel arm and the camera optical system is brought into abutment with the carrier assembly and pushed into a recess of the carrier assembly. The tensioning and resetting means have the purpose of resetting the swivel arm with the camera optical system into a rest position within a recording range of the carrier assembly. The process of moving out of this position has to be performed against the clamping effect, for example, by means of a drive unit.

It is especially advantageous when an electric rotating motor is also arranged in the adjustable axis as a drive unit of the camera optical system, so that the shaft of the motor is located in the adjustable axis of the camera optical system, and the motor together with the camera optical system can be pivoted with the swivel arm. The rotating motor of the camera can be arranged in the vicinity of the camera optical system and can have an especially compact design. Together with the swivel arm, the rotating motor is pivoted away from the carrier assembly and actuates the camera according to the signals of the control unit. When, in this context, we are talking about a drive unit, this term involves also drive units having a transmission, so that the rotary motion of a motor impacts the camera optical system in a transmission ratio.

In an especially preferred embodiment of the invention, the rotating motor is used for rotating the camera, as well as moving the swivel arm. For this purpose, in addition to the camera, an eccentric component is coupled with the motor shaft, which is supported at a support element of the carrier assembly. Depending on the rotation angle of the eccentric component, the adjustable axis moves away from the support element, and the swivel arm together with the camera optical system and the motor is pushed against the resetting force away from the carrier assembly.

Finally, the invention has the objective of providing in a structurally simple and cost-effective manner an improved rear view camera system for a motor vehicle, which avoids the problems known from prior art. In particular, by means of the invention, a camera system shall be provided which is characterized by a maintenance-friendly possibility of cleaning the camera optical system.

This problem is solved by means of a camera system with the characteristics of Claim 24. In particular, the problem is solved in that the camera unit is pivoted about a rotating axis of the camera in the carrier housing, and it is pivoted within the control range between at least one rest position and one recording position, which can be variably adjusted depending on a surrounding area of the vehicle to be recorded, wherein the camera unit is surrounded by a protective tube, which is transparent for the camera optical system.

The invention-based camera system with the characteristics of Claim 24 has a camera module, which is connected in movable fashion with a carrier housing. The carrier housing is designed to be mounted at a motor vehicle, for example, to be fixed in a recess of the sheet metal of the car body. The camera unit together with the drive unit can be camera optical systemed in the carrier housing or they can protrude out of the carrier housing. In the manner described above, the carrier housing is fixed immovably at a movable vehicle component. In the invention-based camera system, the camera unit is pivoted in or on the carrier housing, so that the camera unit can pivot about the rotating axis of the camera. The adjustment range defines a rotation angle in which the camera unit can be rotated by means of the drive unit. However, it is also possible to move the camera unit together with the rotating axis of the camera in relation to the carrier housing, wherein, in addition to the rotation of the camera unit, this movement also characterizes the adjustment range. At the same time, a transparent or clear protective tube is permanently surrounding the camera unit, so that the camera optical system can record the surrounding area of the motor vehicle despite the protective tube. The protective tube protects the camera unit against contamination and can be provided with an appropriate coating, so that liquids and dirt roll off from and do not stick to the surface of the protective tube in the well-known manner of the Lotus effect. It is also possible that, as an alternative or in addition to the coated surface, the protective tube is periodically rotated by means of a drive unit especially designed for this purpose, so that a contaminated surface of the protective tube is rotated out of the range of the camera optical system, when the camera optical system is in recording position. In addition, because of its ability to rotate to a rest position, at least the camera unit can be rotated into a protected position.

By means of the embodiment of the camera unit with the characteristics of Claim 24, the invention provides that the protective tube can be pivoted about the rotating axis of the camera and coupled with the drive unit in such a way that the protective tube can be pivoted about the rotating axis of the camera. By coupling motion parts, it is possible to rotate the protective tube without using a separate drive unit. Instead, the drive unit can be used for rotating the camera unit, as well as the protective tube, so as to rotate periodically the protective tube in order to move contaminated areas of the protective tube out of the visual field of the camera optical system.

In one embodiment of the invention, the mutual use of the drive unit is especially advantageous when the protective tube can be rotated in relation to the camera unit. Only then, contaminated areas of the protective tube could be moved out of the visual field of the camera optical system because otherwise, in synchronous rotation with the camera unit, they would always occupy the same position in relation to the camera optical system.

A further embodiment of the invention provides a structurally particularly favorable design in that the protective tube is coupled via the camera unit to be moved with the drive unit. As a result, the drive unit of the protective tube does not require a separate output chain, and the camera system can be designed in a particularly compact manner.

A further embodiment of the invention provides that the protective tube has a gear with an internal tooth system, wherein the camera unit is connected in torque-proof manner with a coupling gear wheel, which has an external tooth system and which meshes with the internal tooth system of the gear of the protective tube. Accordingly, when the camera unit is rotated by the drive unit, the protective tube is also rotated via the gear connection between the camera unit and the protective tube.

To avoid that the same area of the protective tube is repeatedly rotated with the camera unit, which would involve the danger that a contaminated area of the protective tube is always located in front of camera optical system, it is provided in one embodiment of the invention that the camera unit has a mounting attachment on which the coupling gear wheel is attached in torque-proof manner and which supports the coupling gear wheel eccentrically to the rotating axis of the camera and the gear of the protective tube. The eccentricity represents a type of gear, by means of which the protective tube is rotating at a different rotation angle than that of the camera housing.

Advantageously, in view of this aspect, the invention also provides that the coupling gear wheel is supported in relation to the gear of the protective tube so eccentrically and meshes with the gear of the protective tube in such a way that, in a rotation from rest position to recording position, the camera unit is pivoting about the rotating axis of the camera at a rotation angle which amounts to 10 times or 15 times of the rotation angle with which the protective tube is pivoting about the rotating axis of the camera.

To avoid that, when the camera unit is returned to rest position, the protective tube is not always rotated back by the same rotation angle by which it was rotated in the direction of recording position, a further embodiment of the invention provides a freewheel device, which prevents a rotation of the protective tube, when the camera unit is rotated in the direction of rest position. In this way, it can be achieved that the protective tube is rotated only in one rotational direction, namely only when the camera unit is rotated in the direction of recording position.

Accordingly, a further embodiment of the invention with the characteristics of Claim 24 provides that the protective tube is designed with an internal tooth system, and the freewheel device is designed with the gear of the protective tube and a coupling element which, when rotating in the direction of recording position, meshes with the internal tooth system of the protective tube and, when rotating in the direction of rest position, it is disengaged from the internal tooth system of the protective tube.

One embodiment of the coupling element involves that the coupling element is designed at least in the form of at least one retaining spring having a retaining spring arm, wherein the retaining spring arm is spring tensioned and arranged in such a way that, when rotating in the direction of recording position, it is engaged with the internal tooth system of the protective tube and, when rotating in the direction of rest position, it slides off the internal tooth system of the protective tube. The internal tooth system of the protective tube is designed accordingly, wherein each tooth of the internal tooth system shows in cross section the form of an irregular triangle. When rotating in the direction of recording position, the retaining spring arm is attached to a tooth of the internal tooth system, so that the freewheel device is connected in torque-proof manner with the internal tooth system of the protective tube, and the protective tube and the freewheel device are rotating together and are connected in torque-proof manner with the camera unit via the gear of the protective tube. However, when rotating in the direction of rest position, the teeth of the internal tooth system of the protective tube push the retaining spring out of its movement path, wherein they deflect the retaining spring arm against the force of the retaining spring.

An alternative embodiment of the invention provides for the freewheel device that the coupling element is designed at least in the form of a locking pawl, which is pretensioned by means of a pawl spring element in such a way that the locking pawl engages with the internal tooth system of the protective tube, when rotating in the direction of recording position, and that it slides off the internal tooth system of the protective tube, when rotating in the direction of rest position. Similar to the design of the retaining spring, the coupling element and the internal tooth system of the protective tube are designed in a form-fit connection, when rotating in the direction of recording position, in that the locking pawl is engaged with the internal tooth system of the protective tube. By way of contrast, the teeth of the internal tooth system of the protective tube slide off the locking pawl, when rotating in the direction of rest position, and push it out of its movement path, wherein the internal teeth push the locking pawl away against the force of the pawl spring element.

A further alternative embodiment provides that the coupling element is designed in the form of an external tooth system, wherein the external tooth system engages with the internal tooth system of the protective tube, when rotating in the direction of recording position, and slides off from the internal tooth system of the protective tube, when rotating in the direction of rest position. The cross sections of the teeth of both tooth systems are coordinated, so that, when rotating in the direction of recoding position, the tooth systems form a form-fit connection, while, when rotating in the direction of rest position, the teeth of both tooth systems slide on top of each other, so that only one tooth system is rotating.

For the tooth systems to be able to slide on top of each other and avoid that the tooth systems are mechanically deformed or the tooth systems get jammed, thus preventing the freewheel function, a further embodiment of the invention provides that the protective tube can be moved by means of a spring element in the direction of the rotating axis of the camera, so that, when rotating in the direction of rest position, the coupling element can be moved in relation to the protective tube in such a way that, when rotating in the direction of rest position, the external tooth system can slide on top of the internal tooth system of the protective tube.

A further constructive embodiment of the invention in the form of a camera device with the characteristics of Claim 24 provides that the camera module is coupled with the camera housing via at least one swivel arm, wherein the camera module together with the rotating axis of the camera can be pivoted in relation to the carrier housing. In this connection, resetting means can create an elastic resetting force and return the camera module from an adjusted position, without requiring a separate drive unit.

Finally, an invention-based embodiment of the camera system with the characteristics of Claim 24 provides that the protective tube is attached to a sealing lip, which cleans the protective tube when rotating in the direction of recording position. This sealing lip virtually removes contaminations from the surface of the protective tube, when the protective tube is rotating in relation to the sealing lip.

It is clear that the above-mentioned and subsequently described characteristics can be used not only in the respectively mentioned combinations, but also in other combinations or even alone, without leaving the scope of the present invention. The scope of the invention is defined only by the claims.

BRIEF DESCRIPTION OF THE DRAWINGS

Further details, characteristics and advantages of the subject matter of the invention are included in the subsequent description in conjunction with the drawings, in which preferred embodiments of the invention are shown in exemplary manner. The drawings show:

FIG. 4 shows a different view of the tailboard depicted in FIG. 3 with an enlargement of a detail of the invention-based rear view camera system, FIG. 5 is a diagonal frontal view of the insulated invention-based rear view camera system, FIG. 6 is a diagonal rear view of the arrangement shown in FIG. 5, FIG. 11 is a first sectional view of the rear view camera system with an impact protection according to a first embodiment, FIG. 12 is a second sectional view of the rear view camera system shown in FIG. 11, FIG. 13 is a lateral sectional view of the rear view camera system with the impact protection according to the first embodiment and the camera optical system in rest position, FIG. 14 is a lateral sectional view of the rear view camera system with the impact protection according to the first embodiment and the camera optical system in extended recording position, FIG. 15 is a lateral sectional view of the rear view camera system with the impact protection according to the first embodiment and the camera optical system moved inward into a carrier assembly for protection, FIG. 22 is a perspective view of a modification of the impact protection according to the modification of the third embodiment, FIG. 23 is a lateral sectional view of the rear view camera system with the impact protection according to the modification of the third embodiment and the camera optical system in the extended recording position, FIG. 24 is a lateral sectional view of the rear view camera system with the impact protection according to the modification of the third embodiment and the camera optical system moved inward into a carrier assembly for protection, FIG. 32 shows the camera system with the camera optical system in a second recording position, FIG. 33 is a block diagram of the components of the first embodiment.

FIG. 41b is a different perspective view on the camera unit shown in FIG. 8a,

DETAILED DESCRIPTION

Figure 1:
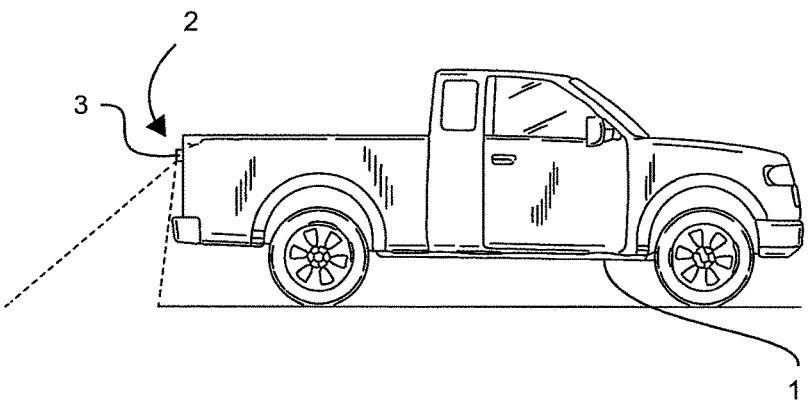
FIG. 1 shows a diagram of an arrangement of an invention-based rear view camera system at the tailboard of a pickup truck.
Figure 2:
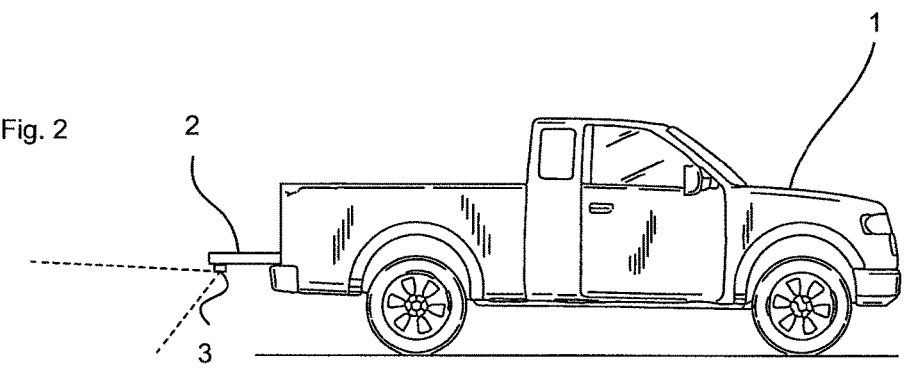
FIG. 2 shows the arrangement depicted in FIG. 1 with an opened tailboard.

FIGS. 1 and 2 show a diagram of a motor vehicle 1, which is designed in the form of a utility vehicle with an open loading platform. In the rear, the loading platform is closed by a vehicle component designed in the form of a tailboard or tailgate 2 which, in the position shown in FIG. 1, limits the loading platform in the rear and, in the folded down position shown in FIG. 2, it opens and extends the loading platform for loading and unloading or for accommodating particularly heavy loads. At the tailboard 2, an invention-based camera system or rear view camera system 3 is arranged. When the tailboard 2 is closed, as shown in FIG. 1, the rear view camera system 3 has a visual range (see dotted line in FIG. 1), which starts directly behind the shock absorber in the rear and extends to a specific space, which depends on the detecting range of the camera optical system.

In addition, the position of the camera with the detecting range shown in FIG. 1 is described to be the first recording position of the camera. This first recording position is activated when the driver actuates a specific switch in the cabin or, for example, engages the reverse gear. Compared with this first recording position, there is also a rest position, in which the camera optical system is rotated in a protected area of the device, to protect it against environmental influences, which shall be subsequently described in more detail. FIG. 2 shows the condition of the vehicle 1 with folded down tailboard 2. It can be observed that, when the camera optical system maintains the same orientation to the tailboard as the one shown in FIG. 1, the detecting range of the camera does not correspond to the desired detecting range, because the rear view camera system 3 would be directed to an area underneath the vehicle. Accordingly, in FIG. 2, the camera optical system of the rear view camera system 3 is brought into a second recoding position. FIGS. 1 and 2 show that in relation to the movable vehicle component 2 to which the rear view camera system 3 is attached, in this case the tailboard, rear view camera system 3 can assume different recording positions. For this purpose, the camera optical system is brought into these different recording positions, depending on the position of the tailboard 2.

Figure 3:
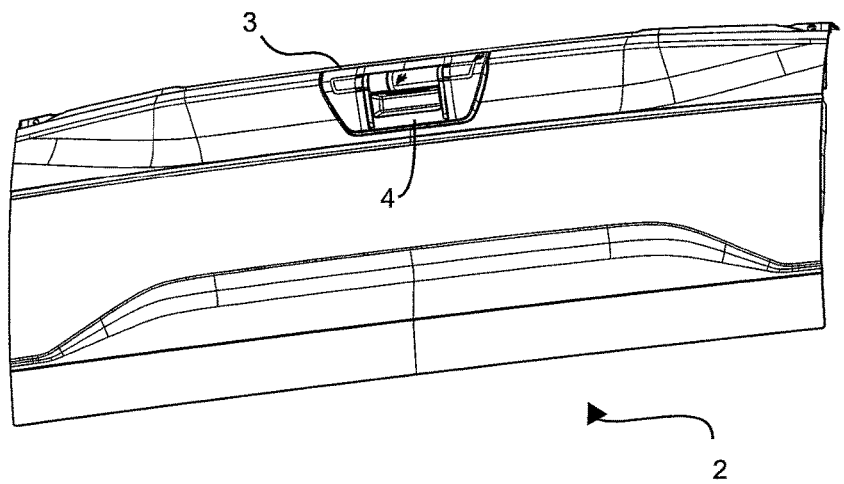
FIG. 3 shows a perspective view of a tailboard with an invention-based rear view camera system.
Figure 25:
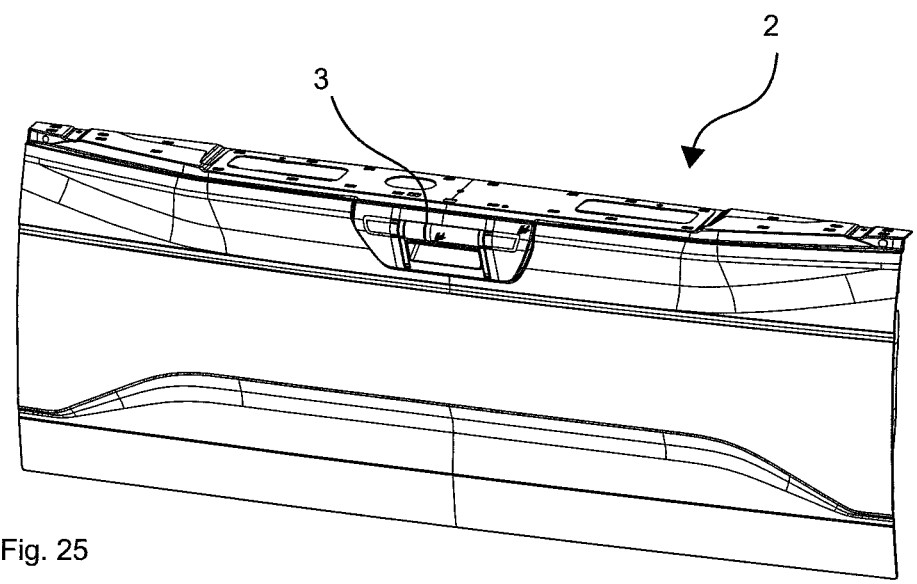
FIG. 25 is a second perspective of the tailboard shown in FIG. 3.

FIGS. 3 and 4 show the tailboard 2 in different perspective views of the invention-based rear view camera system 3, wherein FIG. 3 shows a diagonal view of the tailboard from the bottom, and FIG. 4 shows a diagonal lateral view with an enlargement of a detail. On the other hand, FIG. 25 shows a diagonal view of the tailboard 2 from the top. The rear view camera system 3 is arranged in the center of the upper region of the tailboard 2 and in the embodiment shown, it is provided with a recessed grip 4 for actuating the tailboard 2. The recessed grip 4 can accept customary mechanical or electronic actuating means to unlock and actuate the tailboard 2. This design with an integrated recessed grip in the carrier assembly is an especially space-saving and advantageous design. However, it is also possible to arrange the camera system at a distance from the recessed grip.

FIGS. 3, 4 and 25 have the purpose of illustrating the position of the invention-based camera system 3 in the hatchback. However, because of the fact that the hatchback as such is not the subject matter of the invention, attention is paid to the structure and design on the camera system.

FIGS. 5 and 6 show the invention-based rear view camera system 3 in a representation isolated from the tailboard 2. The carrier assembly 5 is formed in an appropriate manner to be inserted in and attached at a recess of the tailboard 2. Consequently, the carrier assembly 5 is fixed on the motor vehicle 1 at a movable vehicle component 2 and does not change its position in relation to this vehicle component 2, but performs its movements along with it. In this embodiment, the recessed grip 4 with actuating means for unlocking the tailboard (not shown) is arranged in the carrier assembly 5.

In the carrier assembly 5, a camera optical system 6 with a lens 6a is arranged in axial fashion to a drive unit 7. Camera optical system 6 and drive unit 7 are coupled to swivel arms 8a, 8b and arranged between the swivel arms 8a, 8b. At their lower ends, the swivel arms are hinged at the carrier assembly 5. The swivel arms 8a, 8b are also braced at the carrier assembly 5 by means of spring elements or elastic resetting means 9a, 9b, so that the swivel arms 8a and 8b push the camera optical system 6 in the rest position shown in FIG. 5. In rest position, the camera optical system 6, drive unit and swivel arms 8a, 8b are located in a recess 60 of the carrier assembly 5 (for example, see FIG. 8), so that camera optical system 6 and drive unit 7 are basically flush with the outer contour of the carrier assembly 5. In particular FIG. 5 shows that the camera optical system have a tube-like design, wherein also the drive unit 7 has a tube-like housing. Consequently, camera optical system 6 and drive unit 7 form a tube-like component, which extends between swivel arms 8a, 8b, and which can be mutually moved out of the carrier assembly. Furthermore, FIG. 6 shows the arrangement, viewed from the back, clearly showing that in this position, the rest position, the viewing window or lens 6a of the camera optical system 6 points to the inside of the vehicle or the inside of the carrier assembly 5 and is thus protected against environmental influences. Moreover, it can be observed that attached to the carrier assembly 5 is a bar 5a, which can be also described as a support element 5a. The function of the bar 5a is subsequently described in more detail.

FIG. 6 shows the arrangement, viewed from the back, clearly showing that in this position, the rest position, the viewing window or lens 6a of the camera optical system 6 points to the inside of the vehicle or the inside of the carrier assembly 5 and is thus protected against environmental influences. It can also be observed that a bar 5a forms an integral part of the carrier assembly 5. The function of the bar 5a is subsequently described in more detail.

Figure 7:
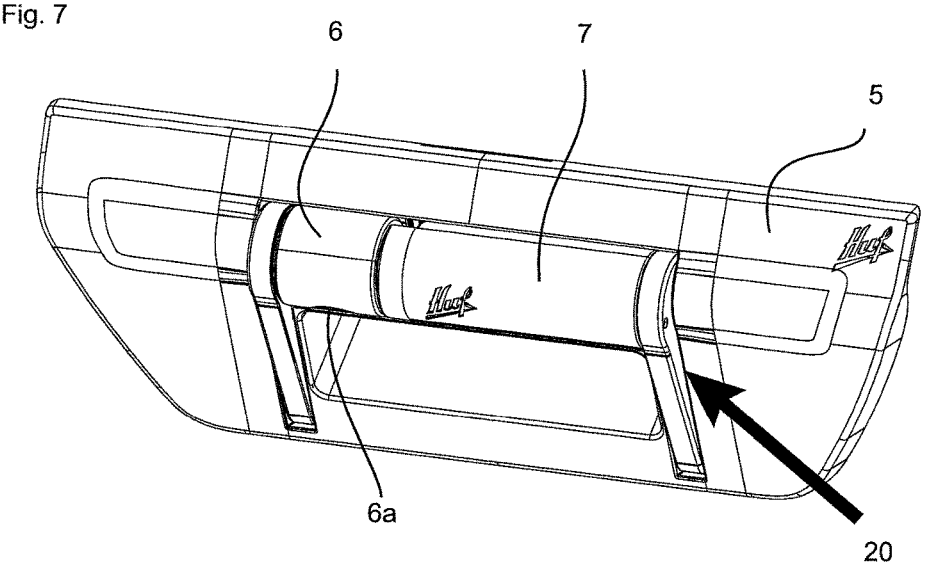
FIG. 7 is a perspective view of the invention-based rear view camera system with the camera optical system in recording position.

To illustrate the function of the rear view camera system, FIG. 7 shows the arrangement depicted in FIG. 5, wherein the camera optical system 6 is moved to recording position. It can be observed that, in this recording position (see FIG. 1), the lens 6a is directed downward. It can also be observed that the camera optical system 6 and the drive unit 7 are pivoted together with the swivel arms 8a and 8b in relation to the carrier assembly 5. The outer contour of the swivel arms 8a and 8b is no longer flush with the carrier assembly 5, but the upper portion of the swivel arms protrudes from the carrier assembly 5, as illustrated by the arrow 20 in FIG. 7. Consequently, in this position, the camera optical system 6 has been rotated and moved out. As a result, it is possible for the lens 6a to provide with an improved visual range on the side of the visual range pointing toward the motor vehicle 1.

Figure 8:
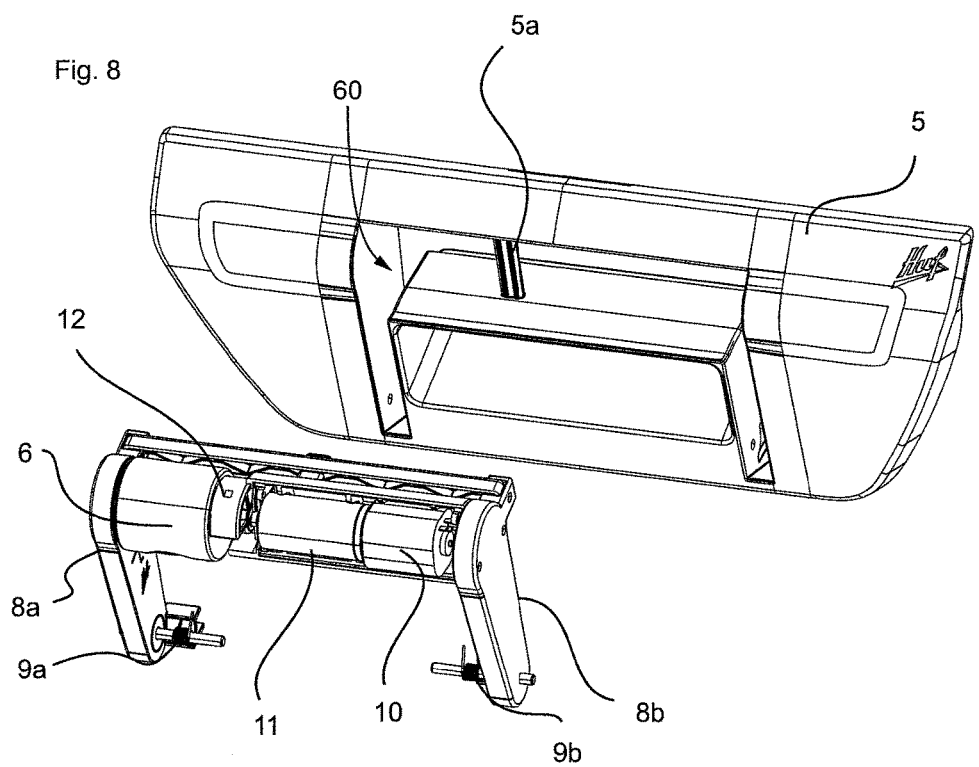
FIG. 8 shows the rear view camera system with a separate carrier assembly.

FIG. 8 shows the arrangement depicted in FIG. 7, wherein it is shown that the camera optical system 6 is arranged at the swivel arms 8a, 8b in axial fashion with the drive unit 7. It is also possible to see the bearings of the swivel arms 8a and 8b with the spring tension in the lower portion of the swivel arms 8a, 8b. The tube-like enclosure or tube-like housing of the drive unit 7 was partially removed to expose the motor 10 and the transmission unit 11. This representation shows that the motor drives the camera unit 6 with a gear reduction 11. This representation also shows an eccentric component 12 which, when mounted, has an interaction with the bar 5a, as described below. Consequently, the eccentric component 12 is rotated with the camera 6 and supported at the bar 5a to cause the pivoting movement of the camera optical system 6 shown in FIG. 7. The drive unit 10 and the transmission 11 ensure the rotation of the camera optical system 6, as well as the pivoting movement of the swivel arms 8a, 8b, in relation to the carrier assembly 5.

Besides the rest position shown in FIG. 5, in which the camera optical system 6 is rotated in such a way that the lens 6a is pointing to the inside of the carrier assembly and protected against environmental influences, the invention-based rear view camera system 3 has at least the recording position shown in FIG. 7.

The rest position of the camera optical system 6 is actuated when the camera optical system 6 is not needed. For example, this can be the case when the motor vehicle 1 is driving at high speed. Furthermore, in rest position, the swivel arms 8a and 8b are flush with the outer contour of the carrier assembly 5. This rest position can be actuated by the control unit via the drive unit.

Because of the fact that the camera optical system 6 can be rotated, it is possible to use different recording positions, so that, if required, the driver can select the recording position variably or depending on the position of the movable vehicle component 2. The function of the camera system shown is now described by means of three discreet positions of the camera optical system.

Besides the rest position, there are at least two recording positions, which can be actuated depending on the position of the tailboard and thus the position of the carrier assembly. For this purpose, a control unit is located in the carrier assembly, on which a position sensor in the form of an acceleration sensor is arranged. Consequently, the control circuit is able to determine the position of the carrier assembly and actuate the drive unit, depending on the position information.

Figure 26:
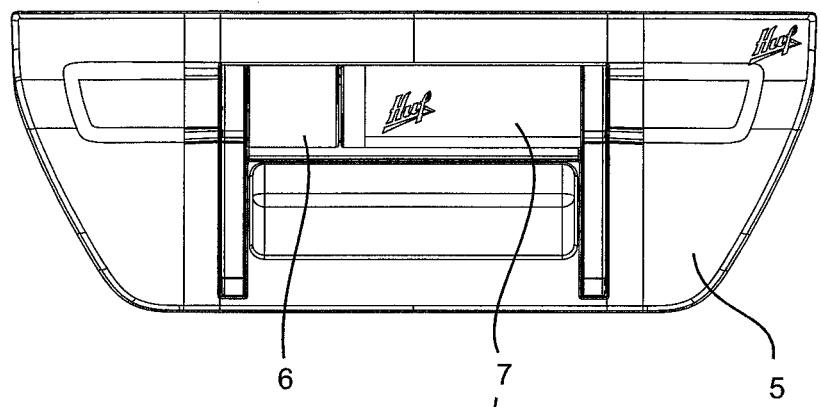
FIG. 26 is a frontal view of the camera system with the camera optical system in rest position.
Figure 27:
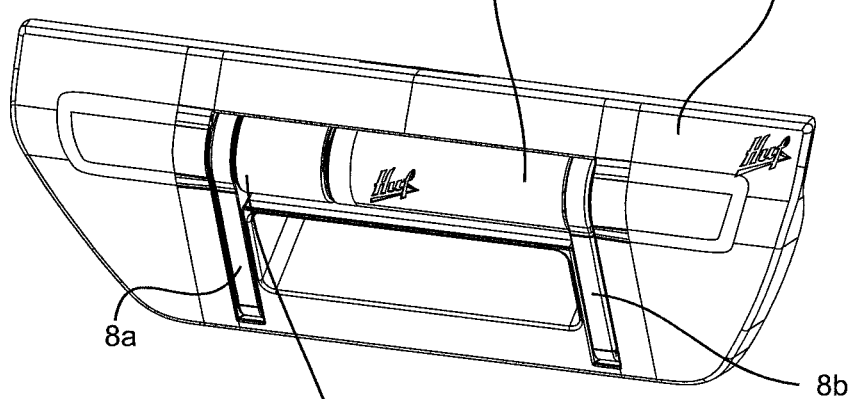
FIG. 27 is a diagonal view of the camera system in the position shown in FIG. 26.
Figure 28:
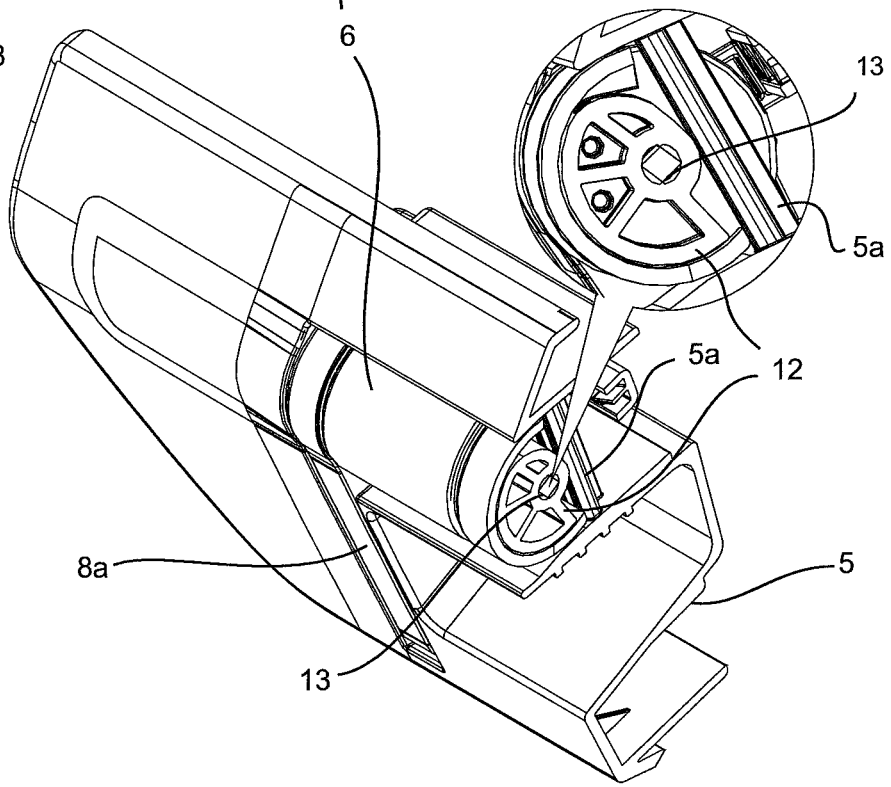
FIG. 28 is a sectional view of the camera system in the position shown in FIGS. 26 and 27.

FIG. 26 shows the rest position of the camera system. The frontal view shown in FIG. 26 depicts that the camera optical system 6 is rotated in such a way that the camera port is pointing to the inside of the carrier assembly 5 and is protected against environmental influences. FIG. 27 shows a different viewing angle which indicates that in rest position the swivel arms 8a and 8b are flush with the outer contour of the carrier assembly 5. FIG. 28 shows a sectional view through the arrangement in the positions shown in FIGS. 26 and 27. It becomes apparent that in this rest position the eccentric component 12 is rotated in such a way that the peripheral region of the eccentric tappet is attached with a minimum radius to the bar 5a of the carrier assembly. Basically, in this position, the eccentric tappet can have a small distance from the bar, when an attachment to the carrier assembly, for example, in the area of the swivel arms 8a and 8b, defines the rest position.

This representation already shows that the rotation of the eccentric tappet, depending on the rotation angle, results in the fact that the drive shaft 13 and the support element 5a are supported and spaced differently. With the impact of the eccentric component 12, it is possible to achieve a simultaneous pivoting movement when the camera optical system is actuated for rotation. Each rotation position of the camera optical system 6 is associated with a pivoting movement predetermined by the geometry of the eccentric tappet.

Figure 29:
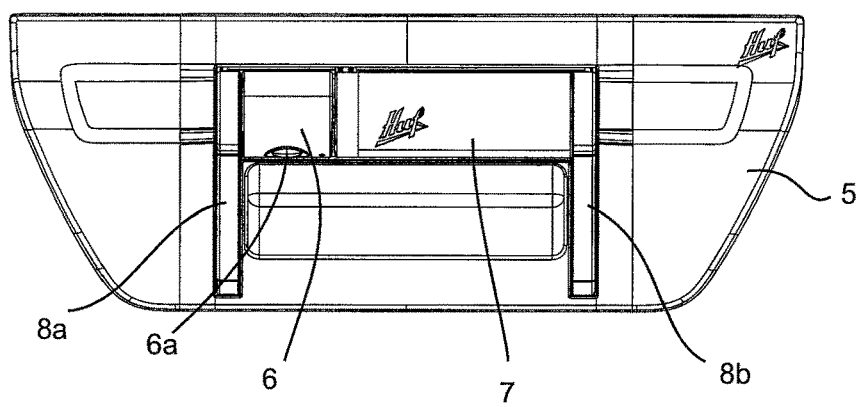
FIG. 29 shows the camera system with the camera optical system in a first recording position.

FIG. 29 shows the camera system in a first recording position. The lens 6a of the camera optical system 6 is rotated out of rest position into the first recording position. In this position, the lens 6a is focused downward, past the tailboard.

Figure 30:
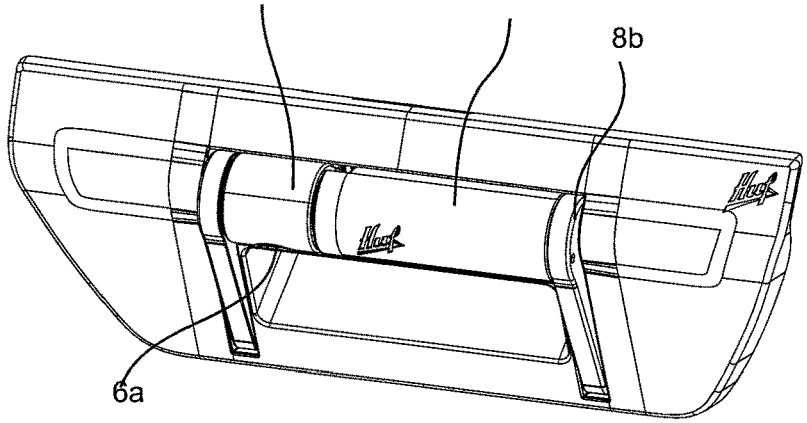
FIG. 30 is a second view of the camera system in the position shown in FIG. 29.
Figure 31:
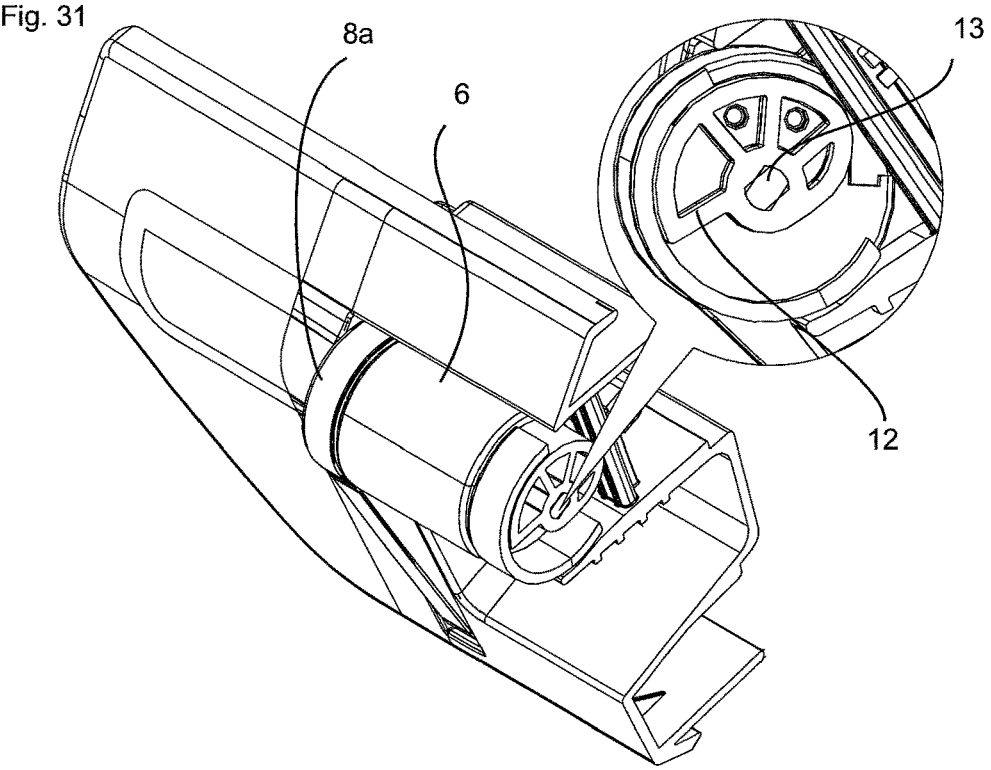
FIG. 31 is a sectional view of the camera system in the position shown in FIGS. 29 and 30.

FIG. 30 shows that, in this first recording position, the swivel arms 8a and 8b are extended from the carrier assembly 5 to improve the visual field of the lens 6a. The sectional view of FIG. 31 shows the respective position of the mechanical component. The camera optical system 6 was rotated at a rotation angle of approximately 90 degrees. The coupled eccentric component 12 was also rotated about the same rotation angle with the camera. Therefore, an outer peripheral region of the eccentric tappet came to be attached to the support element 5a at a great radial distance from the drive shaft 13. This process of pushing the eccentric component together with the drive shaft 13 away from the support element 5a results in a pivoting movement of the swivel arms 8a and 8b. In this way, the pivoting movement and motion of the camera are performed in synchronous manner by the drive unit 7.

Figure 9:
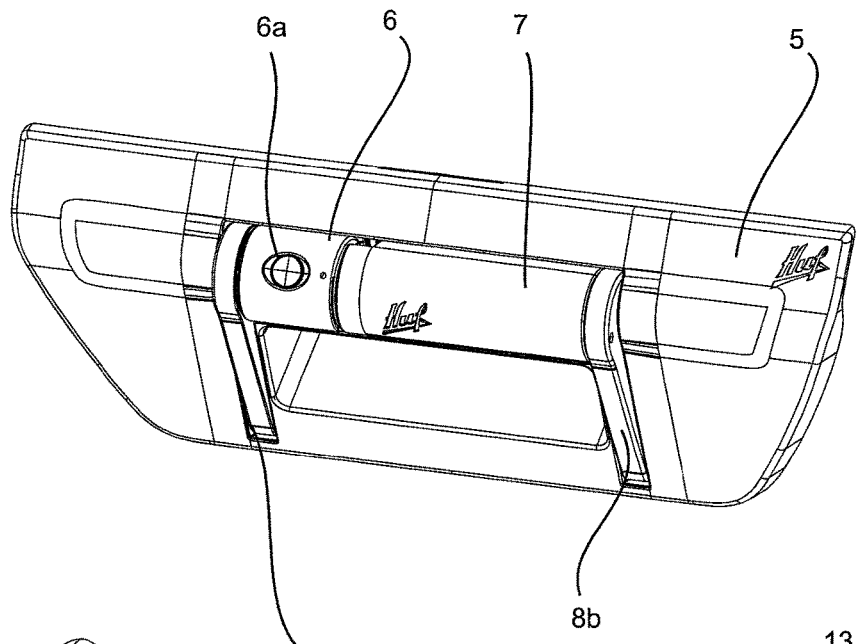
FIG. 9 is a perspective view of the invention-based rear view camera system with a camera optical system in a different recording position, in which the camera optical system is protruding.
Figure 10:
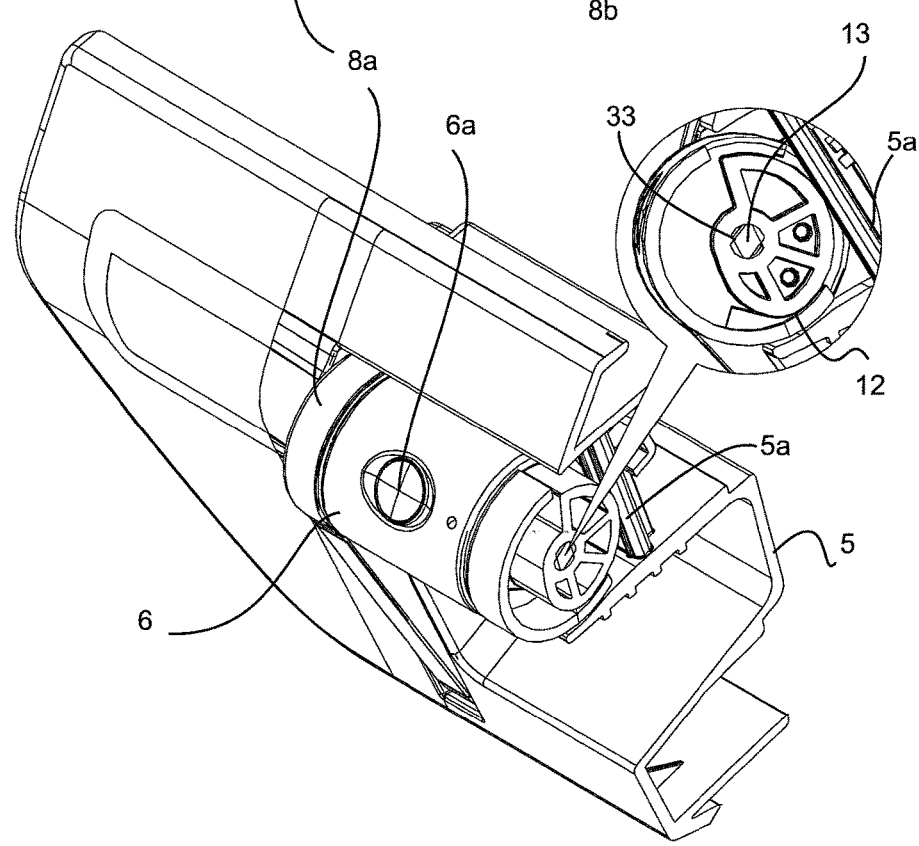
FIG. 10 is a sectional view of the rear view camera system with the camera optical system in the position shown in FIG. 9.

FIGS. 32, 9 and 10 show the second recording position of the camera. FIG. 32 shows that the lens 6a is no longer focused downward in the drawing plane in relation to the carrier assembly 5, but is now focused diagonally upward. This recording position of the camera optical system 6 involves the orientation of the camera shown in FIG. 2, because the carrier assembly 5 and the tailboard 2 can now be pivoted into a horizontal position. Position sensors in the control unit specify the information regarding the position of the carrier assembly 5 and the drive unit 6 is actuated to move the camera optical system 6 not to the first recording position but via a larger rotation angle to the second recording position. FIG. 9 shows that, even in this position, the swivel arms 8a and 8b together with the camera optical system 6 and the drive unit 7 have been moved out of the recess 60 of the carrier assembly 5. FIG. 10 shows a sectional view through the arrangement shown in FIG. 9, wherein the eccentric component 12 continues to be supported by the support element 5a and has been rotated by approximately 180 degrees in relation to the position shown in FIG. 28. Compared to the first recording position, this basically results in a similar pivoting width of the swivel arms. At the same time, it results in a considerably different rotation angle of the lens 6*a* to change the visual range of the lens when the tailboard has been folded down. The sectional view of FIG. 10 shows that the eccentric component 12 is supported by the support element 5*a*. Compared to the rest position, in which the eccentric component 12 is rotated in such a way that the peripheral region of the eccentric component 12 is attached with a minimum radius at the bar 5*a* of the carrier assembly 5, in the recording position of the camera optical system 6 shown in FIGS. 9 and 10 the eccentric component 12 is rotated by approximately 180 degrees.

The sectional view of FIG. 10 also shows that the eccentric component 12 is coupled to move with a rotary shaft 13 of the motor 10, wherein the camera optical system 6 is also coupled with the rotary shaft 13. At the same time, the rotary shaft 13 represents an adjustable axis 33 about which the eccentric component 12 can be rotated. On the other hand, the rotary shaft 13 can be coupled to move directly or via a transmission with the adjustable axis 33. It is important that rotary shaft 13 and adjustable axis 33 ensure that the camera optical system 6 and the eccentric component 12 can be rotated about the adjustable axis 33. It can be observed that, when rotating the eccentric component 12, depending on the rotation angle, the shaft 13 or adjustable axis 33 is supported and spaced differently from the support element 5*a*. When rotating the eccentric component 12, based on the rest position, an outer peripheral region of the eccentric component 12 comes to be attached to the support element 5*a* at a great radial distance from the drive shaft 13 or the adjustable axis 33. This process of pushing the eccentric component 12 and the adjustable axis 33 away from the support element 5*a* results in the fact that the swivel arms 8*a* and 8*b* are pivoted from the carrier assembly 5. In this way, the pivoting movement and motion of the camera are performed in synchronous manner by the drive unit 7, which drives the adjustable axis 33 via the drive shaft 13. Consequently, when actuating the camera optical system 6 for rotation, it is possible to achieve a simultaneous pivoting movement by actuating the eccentric component 12. Each rotation position of the camera optical system 6 is associated with a pivoting movement predetermined by the geometry of the eccentric tappet. The camera optical system 6 can have a rotation range of approximately 200 degrees.

The demonstration of FIGS. 9, 10 and 26 to 32 shows that the camera has a rotation range of approximately 200 degrees. The cable feed for the camera optical system is also able to perform such a pivoting range when it is axially guided into the camera optical system and guided through one of the swivel arms into the interior of the carrier assembly 5.

The embodiment shown is merely a preferred design in which by means of a single drive 7, it is possible to perform the rotation of the camera optical system 6 from a rest position to at least two further recording positions, as well as a pivoting movement for improving the recording position. However, according to the invention, it is not required to pivot the camera optical system by means of swivel arms 8*a*, 8*b*. It is important that the position of the camera optical system 6 is controlled, depending on the position of the movable vehicle component.

To protect the camera optical system 6 during extension against external forces, it is provided that the rear view camera system 3 is resiliently mounted in the carrier assembly 5. For example, when the rear view camera system 3 is mounted in the tailboard of a pickup truck, it is possible that mechanical forces impact the camera optical system 6, for example, when the tailboard 2 is folded down on a support or platform or an obstacle. Then, when the camera optical system comes to rest on an object, the weight of the tailboard 2 bears of the camera optical system 6 and the rear view camera system 3. Therefore, for resilience, the invention-based rear view camera system 3 is provided with an impact protection, which allows the camera optical system 6 to perform an evasive movement from one of many recording positions, in which the camera optical system 6 protrudes from the recess 60 of the carrier assembly 5, back into the recess 60 of the carrier assembly 5. At the same time, the evasive movement is performed against an evasive force exerted by the impact protection. In other words, the camera optical system 6 is sprig-mounted via the impact protection to the carrier assembly 5.

FIGS. 11 to 15 show a first embodiment of an impact protection 70*a*, which is designed in the form of an elastic pressure spring. In this connection, the bar-like support element 50*a* is supported at the elastic pressure spring 51, wherein it also serves as an attachment for the eccentric component 12. Under compression of the elastic pressure spring 51, the bar or support element 50 can be shifted in relation to the carrier assembly 5 or into the recess 60. For this purpose, the support element 50*a* is incorporated in a guide 52 in which it is retained in movable fashion by means of a pressure spring 50*a*. The guide 52 of the support element 50*a* is shown in FIG. 12. When a force is exerted on the camera optical system 6 (or on the drive unit 7 of the camera optical system 6, which also protrudes from the carrier assembly), the camera optical system 6 can be pushed back into the carrier assembly 5 by power transmission of the eccentric component 12 against the compression force, i.e., the evasive force, of the pressure spring 51. In the retracted position, the camera optical system is protected from being damaged, because it no longer protrudes from the carrier assembly 5. After eliminating the compressive force from the outside, the elastic pressure spring 51 returns the camera optical system 6 to starting position, wherein the support element 50*a* slides in its guide until in end position it provides the attachment for the eccentric component 12. FIGS. 13 to 15 show an exemplary operation of the rear view camera system 3. In FIG. 13, the camera optical system is in rest position, in which it is lowered into the recess 60 of the carrier assembly 5 together with the drive unit 7 and the swivel arms 8*a*, 8*b*. In rest position, an outer peripheral region of the eccentric component 12, which has a minimum radial distance to the adjustable axis 33, comes to be attached at the support element 50*a*. When activating the rear view camera system 3, the drive unit 7 rotates the shaft and thus the adjustable axis 33, so that the camera optical system 6 and the eccentric component 12 rotate about the adjustable axis 33. These rotations result in the fact that, on the one hand, the lens 6*a* is rotated to a recording position and, on the other hand, an outer peripheral region of the eccentric component 12 is attached with increasing radial distance at the adjustable axis 33 to the support element 50*a*. Because of the fact the evasive force of the elastic pressure spring 51 is greater than the resetting force of the resetting means 9*a*, 9*b*, the rotation of the eccentric component 12 achieves that the adjustable axis 33 mounted at the pivoting swivel arms 8*a*, 8*b* and thus the camera optical system 6, as well as the drive unit 7 are moved out of the recess 60 of the carrier assembly 5, assuming a protruding recording position, as shown in FIG. 14. FIG. 15 shows the case in which the camera optical system 6 comes in contact with an obstacle 100. If the force with which the obstacle 100 pushed on the camera optical system 6 is greater than the evasive force of the impact protection 70a or the elastic pressure spring, the support element 50a is moved against the guide 52 into the carrier assembly 5, wherein the distance between the adjustable axis 33 and the support element 50a does not change in relation to the protruding recording position shown in FIG. 14, which is shown by the position of the eccentric component 12. Despite the unchanging distance, the camera optical system 6 is moved into the recess 60, in which it is protected against damage by the obstacle. Coupling motion parts results in the fact that, when the camera optical system 6 is moved, the swivel arms 8a, 8b are also moved into the recess 60 and are there arranged flush with the outer contour of the carrier assembly 5. As soon as the force of the obstacle 100 stops impacting the camera optical system 6, the elasticity of the pressure spring 51 achieves that the camera optical system 6 is moved out of the recess 60 and assumes again the recording position shown in FIG. 14.

Figure 16:
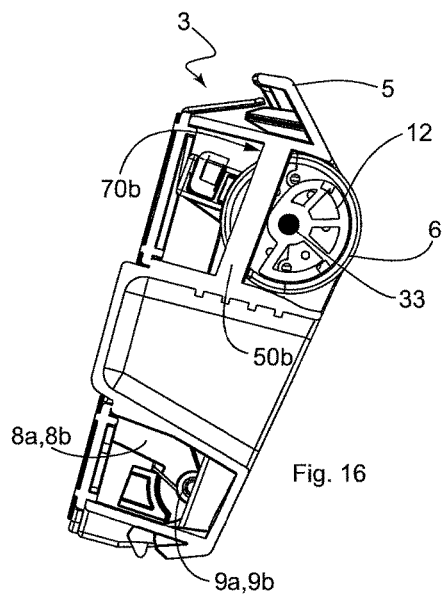
FIG. 16 is a lateral sectional view of the rear view camera system with an impact protection according to a second embodiment and the camera optical system in rest position.
Figure 17:
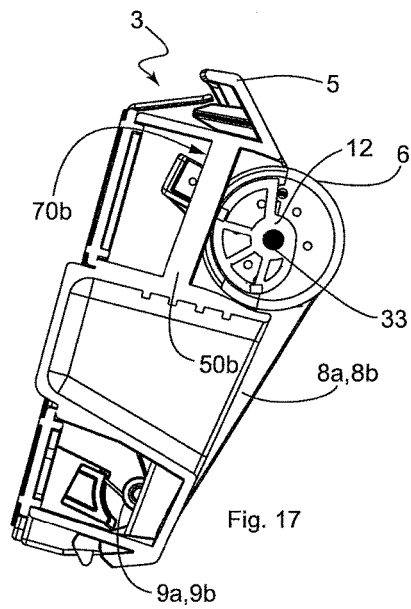
FIG. 17 is a lateral sectional view of the rear view camera system with the impact protection according to the second embodiment and the camera optical system in an extended recording position.
Figure 18:
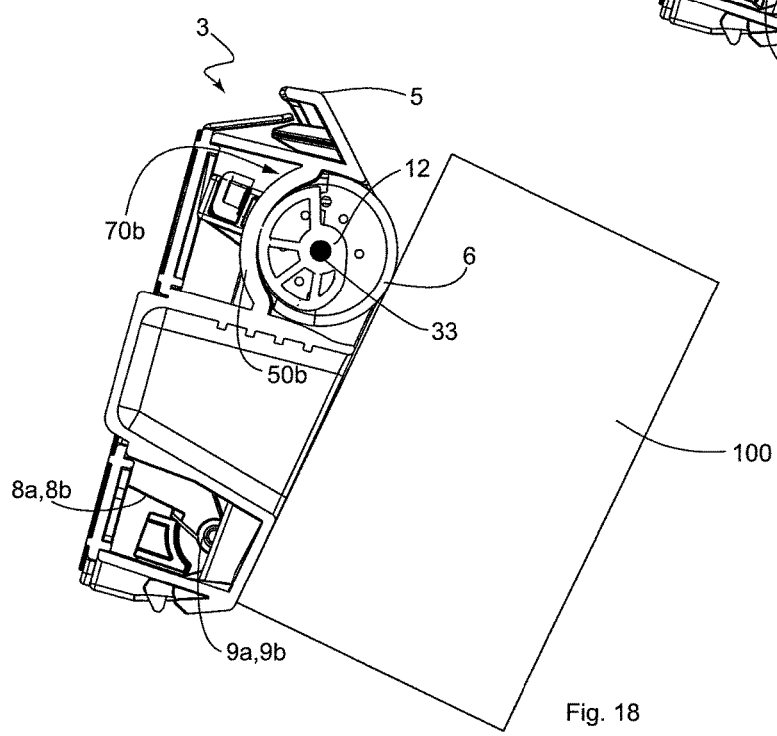
FIG. 18 is a lateral sectional view of the rear view camera system with the impact protection according to the second embodiment and the camera optical system moved inward into a carrier assembly for protection.

In contrast to the embodiment shown in FIGS. 11 to 15, in which the support element 50a has a rigid design and is arranged in movable fashion in the carrier assembly 5, the second embodiment of an impact protection 70b provides that the support element 50b has an elastically deformable design, as is shown in FIGS. 16 to 18. Accordingly, it is possible to do without a pressure spring like the one provided in the first embodiment of the impact protection 70a. The support element 50b of the embodiment shown in FIGS. 16 to 18 is also the impact protection 70b. As long as the eccentric component 12 exerts a force on the support element 50b, which is smaller than a predetermined evasive force, an outer peripheral edge of the eccentric component 12 is supported on the support element 50b, when the eccentric component 12 is rotating about the adjustable axis 33. FIG. 16 shows the camera optical system 6 again in rest position, in which the distance between the adjustable axis 33 and the support element 50b is smallest, wherein in this position an outer peripheral region of the eccentric component 12 is attached at the support element 50b, which has the smallest radial distance from the adjustable axis 33. In FIG. 17, the eccentric component 12 rotates about the adjustable axis 33 in such a way that an outer peripheral region of the eccentric component 12 comes to be attached at the support element 50b, which has the greatest radial distance to the adjustable axis 33. As a result, the distance between adjustable axis 33 and support element 50b is at a maximum, so that the camera optical system moves out of and protrudes from the recess 60 of the carrier assembly 5. Furthermore, FIG. 18 shows a condition in which the camera optical system 6 also comes in contact with an obstacle 100, wherein the obstacle 100 exerts a force on the camera optical system 6, which is greater than the evasive force of the impact protection 70b or the elastically deformable support element 50b. Because of the fact that the support element 50b can be elastically deformed, when a force is exerted, which is greater than a predetermined evasive force (in this case, the evasive force equals a deformation resistance, which can be predetermined by the selection of the material of the support element), the support element 50b is deformed in the way shown in FIG. 18. As a result, the support element 50b is yielding when the obstacle 100 is pushed on the camera optical system 6 with a force, which is greater than the evasive force. As soon as the force is no longer exerted, the camera optical system 6 is moved back to the recording position shown in FIG. 17, because the elastically deformable support element 50b also assumes its original shape of a linear bar. Consequently, according to the embodiment of FIGS. 16 to 18, the support element 50b has the shape of a bar and can be elastically deformed. At the same time, it represents the impact protection, wherein the eccentric component 12 can be moved against the evasive force of the elastically deformable support element 50b in relation to the carrier assembly 5 in such a way that, as a result of the elastic deformation of the support element, the camera optical system 6 can be moved back into the recess 60 of the carrier assembly 5.

The first and second embodiment of the impact protection 70a, 70b, can be described in an abstract manner in such a way that the respective support element 50a, 50b is elastically coupled with the carrier assembly 5, so that the support element 50a, 50b can be moved and/or elastically deformed in relation to the carrier assembly 5 by overcoming the evasive force of the impact protection 70a, 70b.

Figure 19:
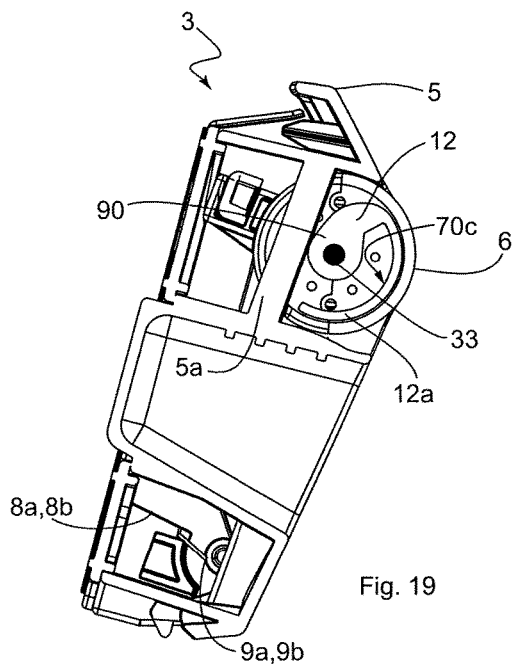
FIG. 19 is a lateral sectional view of the rear view camera system with an impact protection according to a third embodiment and the camera optical system in rest position.
Figure 20:
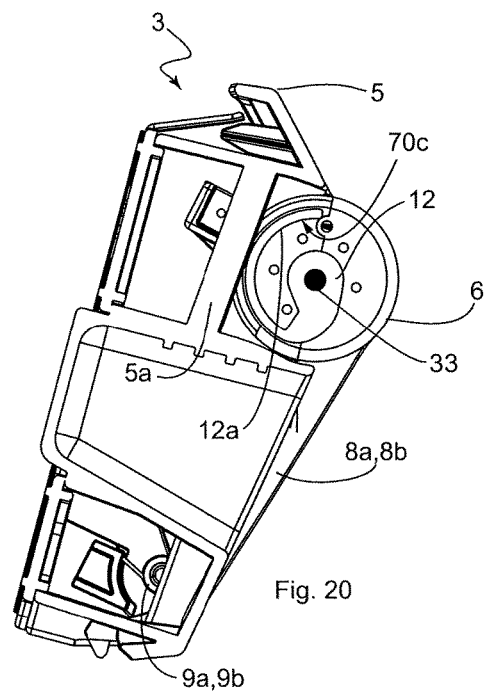
FIG. 20 is a lateral sectional view of the rear view camera system with the impact protection according to the third embodiment and the camera optical system in the extended recording position.
Figure 21:
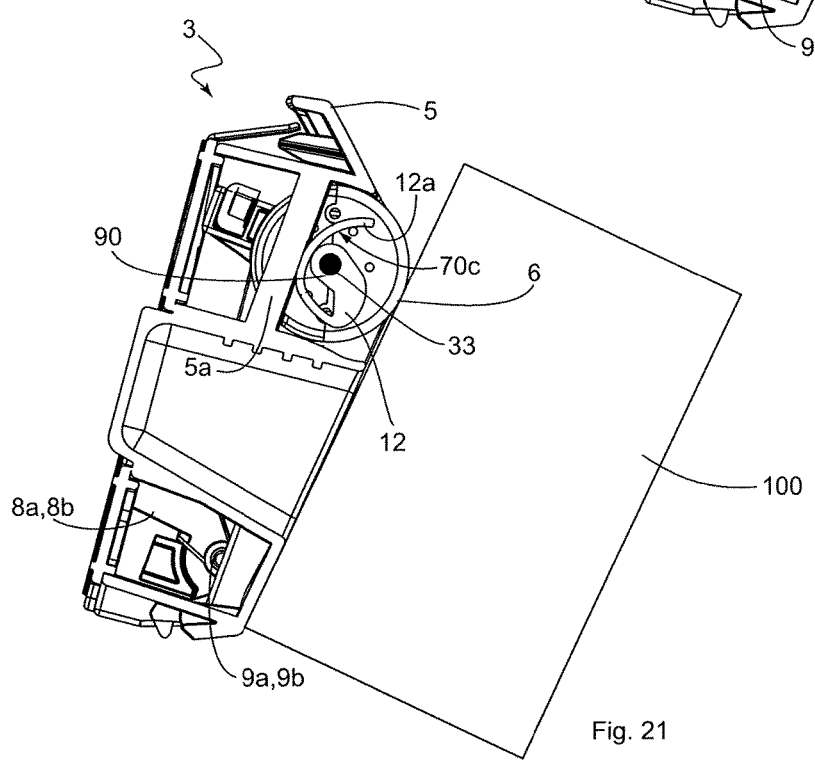
FIG. 21 is a lateral sectional view of the rear view camera system with the impact protection according to the third embodiment and the camera optical system moved inward into a carrier assembly for protection.

FIGS. 19 to 21 show a third embodiment of the impact protection 70c. In contrast to the first and second embodiment, here the support element 5a is again designed in the form of a rigid bar, which is fixed at the carrier assembly 5. In the third embodiment, the eccentric component 12 represents the impact protection 70c. This impact protection 70c is characterized in that the eccentric component 12 has at least one outer peripheral region 12a that is designed in elastically deformable manner. The importance of this elastically deformable outer peripheral region 12a is subsequently described in more detail. In FIG. 19, the camera optical system 6 is again shown in its rest position, in which it is protected together with the drive unit 7 and the swivel arms 8a, 8b in the recess 60 of the carrier assembly 5. The eccentric component 12, in turn, is designed with having a semicircular outer peripheral region 12a, wherein in rest position a section of the eccentric component 12, which has the smallest radial distance to the adjustable axis 33, comes to be attached at the support element 5a. When the adjustable axis 33 is rotated in response to a rotation of the drive shaft 13, it results in a rotation of the eccentric component 12, which then results in the fact that a section of the eccentric component 12, which has a larger radial distance from the adjustable axis 33, comes to be attached at the support element 5a. As a result, the camera optical system 6 is pushed out of the recess 60 and protrudes from the recess 60 and the carrier assembly 5, as is shown in FIG. 20. When now the camera optical system 6 comes in contact with an obstacle 100, and the force exerted by the obstacle 100 on the camera optical system 6 exceeds a predetermined evasive force of the impact protection 70c or elastically deformable outer peripheral region 12a, the camera optical system 6 is shifted to the position shown in FIG. 21, in which it is lowered into the recess 60 and protected in flush arrangement with the outer contour of the carrier assembly 5. Because of the elasticity of the outer peripheral region 12a, the eccentric component 12 can be moved in relation to the carrier assembly 5 in such a way that, because of the elastic deformation of the at least one elastically deformable outer peripheral region 12a, the camera optical system 6 can be moved into the recess 60 of the carrier assembly 5, as is shown in FIG. 21. At the same time, in the embodiment of FIGS. 19 to 21, the eccentric component 12 is designed in the form of a plastic component, forming one piece with the housing of the camera optical system 6. The eccentric component 12 has a basic body 90, which is coupled centrally with the adjustable axis 33. As shown in FIG. 21, the spring-arm-shaped outer peripheral region 12a is integrally molded at the basic body 90 and extends in semicircular manner around the basic body 90 and can be bent inward in the direction of the basic body 90 when predetermined evasive forces are exceeded. As soon as the force exerted by the obstacle 100 stops impacting the camera optical system 6, the outer peripheral region 12a is formed back to its original shape, so that the camera optical system assumes again the recording position shown in FIG. 20.

FIGS. 22 to 24 show by means of a third embodiment a modification of the impact protection 70c. In this modification, the impact protection 70c has a two-part design and comprises a spring element 110 consisting of metal and a housing 200 of the camera optical system 6. At the same time, the spring element 110 is mounted at the housing 200 of the camera optical system 6 and forms the eccentric component 12, which is supported at the support element 5a when it is rotated about the adjustable axis 33. As a result, the camera optical system 6 assumes the position shown in FIG. 23, in which the camera optical system 6 protrudes from the recess 60 of the carrier assembly 5. The function of the impact protection shown 70c in FIGS. 22 to 24 corresponds to the operating modes of the embodiments shown in FIGS. 19 to 21, so that reference can be made to these embodiments. Even in the embodiment shown in FIG. 24, the spring element 110, which has an elastically deformable and semicircular region 12a, is compressed when an obstacle 100 impacts the extended camera optical system 6 with a force, which is greater than the evasive force of the spring element 110, so that the camera optical system 6 is moved back for protection into the recess 60 of the carrier assembly 5, until the obstacle is no longer interfering.

Identical reference numerals used in FIGS. 19 to 24 refer to the respective identical or same element or components.

It is actually possible to control the camera system with means known from prior art. The embodiment of FIG. 33 shows the connection of the components in a block diagram.

A motor control system 30 is coupled with the drive unit 31. The motor is provided with reduction gear.

The position sensor 33 supplies information regarding the position of the carrier assembly, which is arranged in the tailboard. The position sensor supplies a position angle depending signal to the motor control system 30. A central vehicle control unit 32 provides the motor control system with signals as to whether the camera system should be activated. For example, the vehicle control unit applies a respective signal to the motor control system 30 when the reverse gear is engaged. From both signals, the motor control system 30 derives an activation signal or a signal sequence for the motor. Depending on the signals, the motor is actuated by the sensor 33 and the central control unit 32.

It is important that the control unit camera optical systems position information, for which purpose it can have a position sensor, or it camera optical systems the information from a remote position sensor. As described above, the position sensors can involve continuously operating position sensors in the form of acceleration sensors or sensors operated by means of a gyroscope, as well as discreet sensors, for example, contact switches in the locking area of a tailboard or hatchback. Depending on the position information, the drive unit can be actuated by means of a step motor control system, in order to detect the desired position, depending on the actual position.

In the embodiment shown, the camera is depicted to pivot about a rotating axis, but it is also possible to implement a pure pivoting movement of the camera out of its rest position or a different combined rotary motion or translational movement, as they are known from customary rear view camera systems with retractable cameras.

An expert will recognize that the embodiments shown in FIGS. 1 to 33 can be further developed to integrate further functional elements in the carrier assembly. In particular, it is possible to integrate lighting elements, preferably signal lights, such as stop lights, in the component. In this way, a single component can comprise a plurality of mutually mounted functional elements.

FIGS. 34 to 44c show an embodiment of a camera system, which is provided with a protective tube, wherein this characteristic can be transferred also to the embodiments of a rear view camera according to FIGS. 1 to 33, and the characteristics of the rear view camera according to FIGS. 1 to 33 can also be transferred to the characteristics of the embodiments of the camera system according to FIGS. 34 to 44c.

Figure 34:
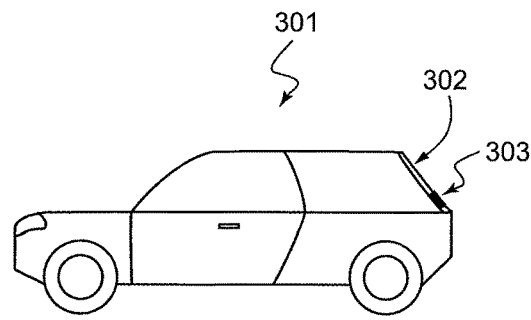
FIG. 34 is a lateral view of a motor vehicle with an invention-based camera system with the characteristics of Claim 24.
Figure 35:
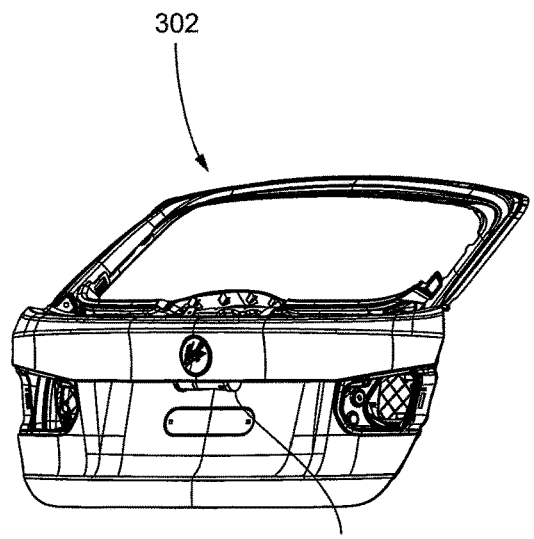
FIG. 35 is a perspective view on a hatchback of the motor vehicle with the invention-based camera system with the characteristics of Claim 24.

FIG. 34 shows an exemplary motor vehicle 301 in the form of a passenger car which, in the example, has a movable vehicle component or hatchback 302 to which a camera system 303 according to the invention has been attached. FIG. 35, in particular, shows that the camera system 303 is arranged in the external paneling of the vehicle 301 and mounted in such a way that it is partially hidden.

Figure 36:
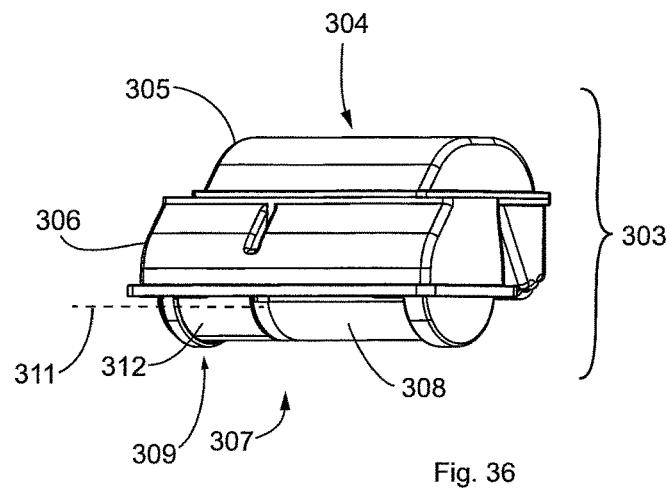
FIG. 36 is a perspective view on the invention-based camera system shown in FIG. 35.
Figure 37:
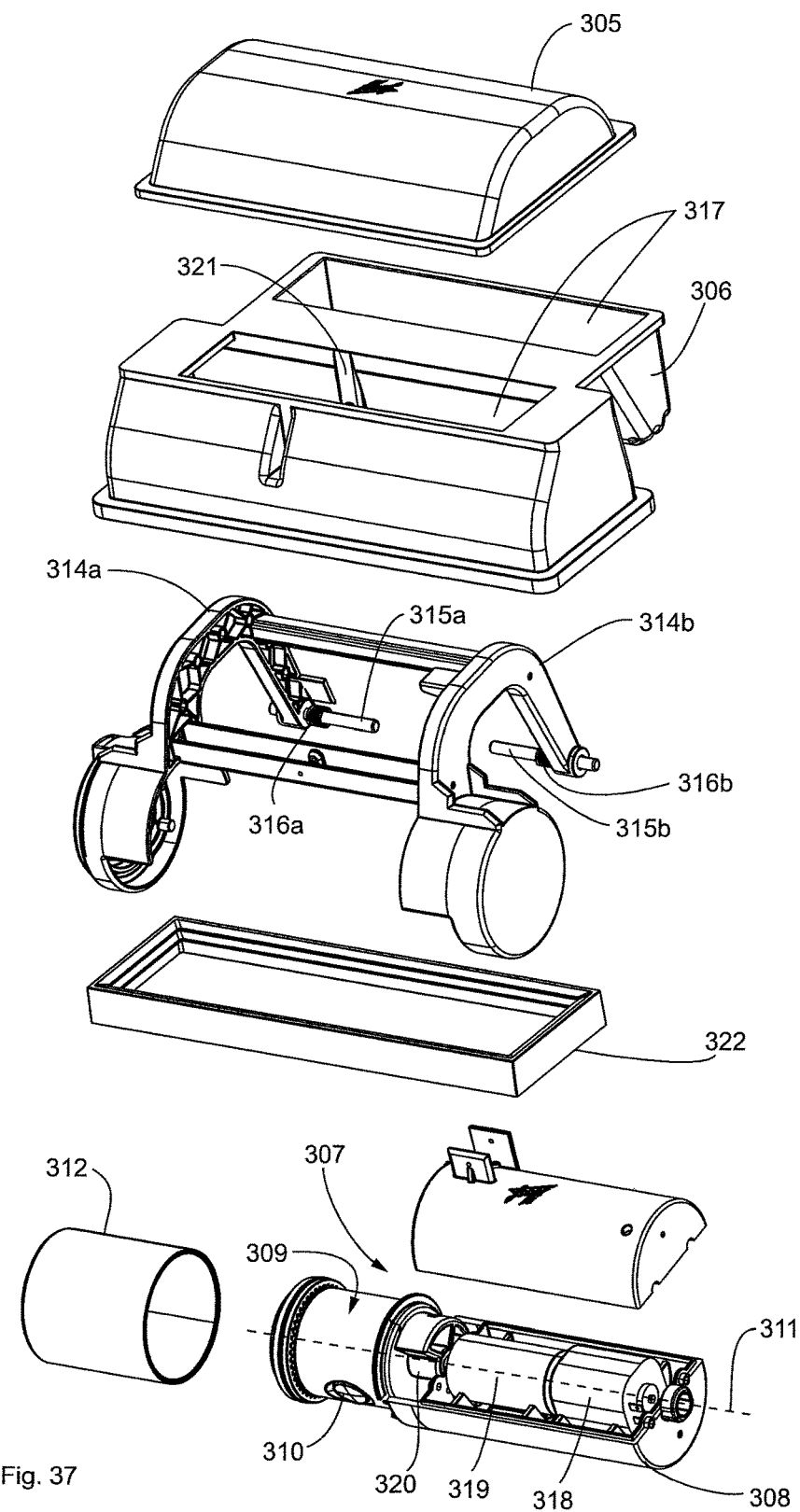
FIG. 37 is an exploded perspective view of the invention-based camera system shown in FIG. 36.

FIGS. 36 and 37 show the invention-based camera system 303, which is subsequently described in more detail. The camera system 303 comprises a carrier housing 304, which is arranged and mounted at the hatchback or movable component 302 of the motor vehicle, so that it can be pivoted together with the hatchback 302 in relation to the motor vehicle 301. The carrier assembly 304 has a two-part design and comprises a cover 305, which is laser-welded to the base 306. In addition, the camera system 303 comprises a camera module 307, which can be moved in relation to the carrier assembly 304. The camera module 307 has a drive unit 308 and a camera unit 309 with camera optical system 310. At the same time, the camera unit 309 can be adjusted within a control range by means of the drive unit 308, where it can be retracted and protected, for example, in the carrier housing 304, or arranged to protrude from the carrier housing 304. The carrier housing is fixed at the movable vehicle component 302 of the motor vehicle 301 and does not change its position in relation to this vehicle component 302, but performs its movements along with it. Furthermore, the drive unit 308 is coupled with the camera unit 309, wherein the camera unit can be pivoted about a camera axis 311 and is designed to be pivoted between at least one rest position and one recording position. In FIG. 34, the camera unit 309 is covered by a protective tube 312. The protective tube 312 has a transparent design and is surrounding the camera unit 309.

FIG. 37 shows that the camera unit 309 together with the camera optical system 310 is arranged axially to the drive unit 308 in the carrier housing 304. The camera unit 309 and the drive unit 308 are coupled to swivel arms 314a, 314b and situated between the swivel arms 314a, 314b. The lower ends of the U-shaped swivel arms 314a, 314b are hinged via bearing points 315a, 315b at the carrier housing 304. The swivel arms 314a, 314b are also braced with the carrier housing 304 by means of spring elements or elastic resetting means 316a, 316b, so that the swivel arms 314a, 314b push the camera unit 309 or camera module into rest position. In rest position, at least sections of the camera unit 309 and the drive unit 308 are located in a camera optical systeming space 317 of the carrier housing 304. Especially FIG. 36 shows that the camera unit 309 has a tube-like design, wherein also the drive unit 308 has a tube-like housing 314. As a result, the camera unit 309 and the drive unit 308 form a tube-like component, which extends between the swivel arms 314a, 314b, and which can be together moved out of the carrier housing 304 by means of the swivel arms 314a, 314b. For example, in rest position, the camera module 307, and especially the camera optical system 310, points toward the interior of the vehicle or the interior of the carrier housing 304 and is protected against external influences. As a result, the camera unit 309 and the drive unit 308 can be together moved out of the carrier housing 304 by means of the swivel arms 314a, 314b, wherein at least the camera unit 309 can also be pivoted about the rotating axis 311 of the camera (for example, see FIG. 35).

Furthermore, FIG. 37 shows that the camera unit 309 is arranged axially with the drive unit 308 at the swivel arms 314a, 314b. FIG. 37 also shows the bearing points 315a, 315b of the swivel arms 314a, 314b with the spring tension in the lower region of the swivel arms 314a, 314b. The tube-like enclosure or tube-like housing of the drive unit 308 was partially removed from the remaining part of the drive unit to expose a motor 318 and the transmission unit 319 of the drive unit 308. This representation shows that the motor 318 drives the camera unit 309 with a gear reduction. This representation also shows an eccentric component 320 which, when mounted, is interacting with a support bar 321. The eccentric component 320 is rotated together with the camera unit 309 and supported at the support bar 321 to move the camera unit 309 out in relation to the carrier housing 304. Consequently, the motor 318 and the transmission unit 319 ensure that the camera unit 309 is rotating and the swivel arms 314a, 314b are moved out in relation to the carrier housing 304. At the same time, the eccentric component 320 is also pivoting about the rotating axis 311 of the camera, so that the camera unit 309, as well as the eccentric component 320 can be pivoted about the rotating axis 311 of the camera. When rotating the eccentric component 320, depending on the rotation angle, the rotating axis 311 of the camera is supported and spaced differently from the support bar 5321. During the rotation, a section of the outer perimeter of the eccentric component 320 comes to be attached to the support bar 321 at a great radial distance from the rotating axis 312 of the camera. This process of pushing the eccentric component 320 and the rotating axis 311 of the camera away from the support bar 321 results in the fact that the swivel arms 314a and 314b are pivoted about the bearing points 315a, 315b, which results in the fact that the drive unit 308 is moved together with the camera unit 309 out of the carrier housing 304.

Furthermore, FIG. 37 shows a sealing lip 322, which is arranged in the outlet of the receiving space 317. When the protective tube 312 is moved out of the receiving space 317 and/or is pivoted about the rotating axis 311 of the camera, the surface of the protective tube 312 is removed from the sealing lip 322 and thus cleaned. As shown in FIGS. 36 and 37, the protective tube 312 is pulled over the camera unit 308. The protective tube 312 and the external housing of the drive unit 308 have a cylindrical design and form together with the camera unit 309 a component, which is located between the two swivel arms 314a, 314b and which has a tube-like and cylindrical design. At the same time, the camera unit 309 can be pivoted about the rotating axis 311 of the camera and can be moved together with the swivel arms 314a, 314b out of the camera optical system space 317 by pivoting the swivel arms 314a, 314b about their bearing points 315a, 315b.

Figure 38A:
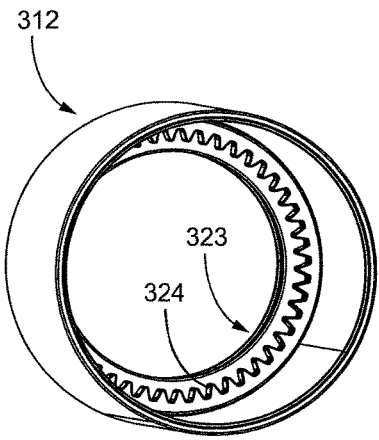
FIG. 38a is a perspective view on a protective tube of the camera system.
Figure 38B:
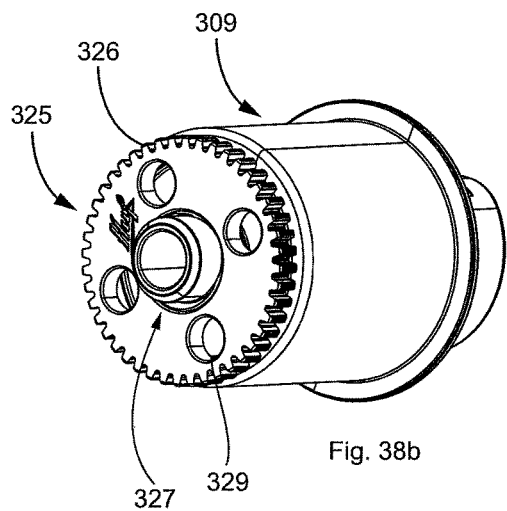
FIG. 38b is a perspective view on a camera unit and a coupling gear wheel.
Figure 39:
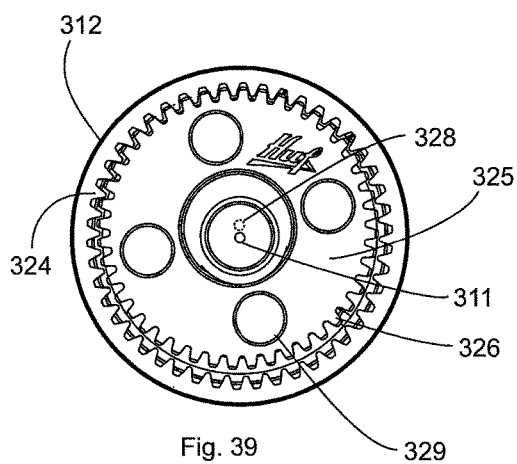
FIG. 39 is a frontal view on the coupling gear wheel and a gear of the protective tube meshing with the coupling gear wheel.
Figure 40:
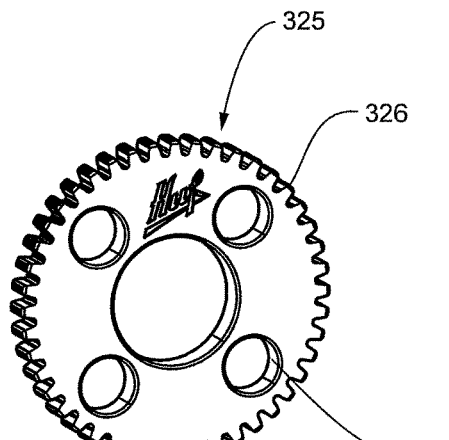
FIG. 40 is a perspective view of the coupling gear wheel.
Figure 41A:
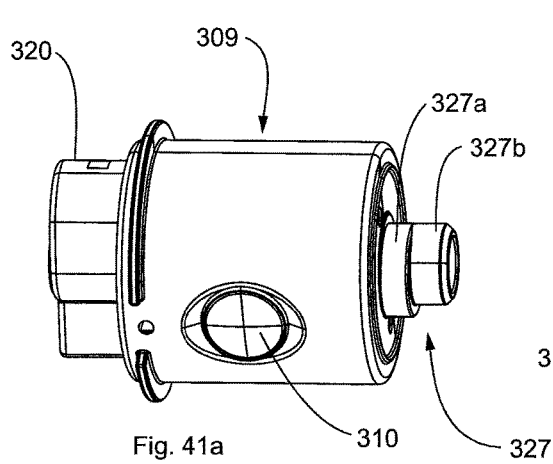
FIG. 41a is a perspective lateral view on the camera unit.
Figure 41B:
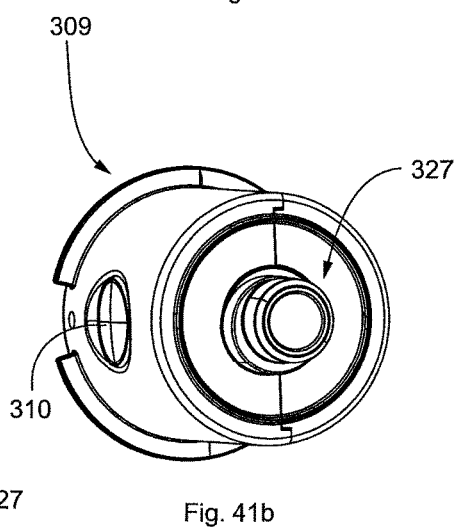

FIG. 37 shows that the camera unit 309 is coupled with the drive unit, so that the shaft of the motor 318 or the transmission unit 319 is connected with the camera unit 309, resulting in the fact that, by means of the drive unit 308, the camera unit 309 can be pivoted about rotating axis 311 of the camera. The protective tube 312 can also be pivoted about the rotating axis 311 of the camera and is coupled to be moved with the drive unit 308. This process of coupling motion parts is performed by means of the camera unit 309, because the protective tube is coupled to be moved with the camera unit 309, so that can be pivoted about the rotating axis 311 of the camera. This process of coupling the motion parts of camera unit 309 and protective tube 312 is performed in that the protective tube 312 has a gear 323 with an internal tooth system 324, as is shown in FIG. 38a, and that the camera unit 309 is connected in torque-proof manner with a coupling gear wheel 325, which has an external tooth system 326 (for example, see FIG. 38b). The camera unit 309 has a mounting attachment 327, which is laterally molded to the housing of the camera unit 309 (for example, see FIGS. 41a, 41b). The eccentric component 320 is molded to the other side of the housing of the camera unit 309, so that the eccentric component 320 and the mounting attachment 327 can be pivoted together with the camera unit 309. The mounting attachment 327 is tiered, wherein the coupling gear wheel 325 is attached in torque-proof manner to the pin stage 327a arranged at the housing of the camera unit 309, whereas the pin stage 327b formed at the free end is pivoted in the swivel arm 314 a. Because of the fact that the external tooth system 326 of the coupling gear wheel 325 (see FIG 40) meshes with the internal tooth system 324 of the gear 323 of the protective tube, the protective tube 312 is coupled to be moved via the coupling gear wheel 325 and then via the camera unit 309 with the drive unit 308. However, this type of coupling motion parts would result in the fact that the protective tube 312, which is designed from transparent material, is rotating always about the same rotation angle as the camera unit 309. This would protect the camera optical system 310 against direct contamination and the like, but the contaminated area of the protective tube 312 would always be in the same position in relation to the camera optical system 310, so that in such a constellation now the protective tube 312 would have to be cleaned instead of the camera optical system 310, which, however, would not constitute an improvement compared to the previous situation.

An advantage would involve that the protective tube 312 can be rotated in relation to the camera unit 309. This is achieved in that the pin stage 327a of the mounting attachment 327 supports the coupling gear wheel 325 eccentrically to the rotating axis 311 of the camera and to the gear 323 of the protective tube. This is illustrated by an overview of FIGS. 38a to 41b, which show the technical characteristics described above. Accordingly, the rotating axis 328 for the coupling gear wheel 325 is arranged offset to the rotating axis 311 of the camera, as is shown, for example, in FIG. 39. By appropriately selecting the eccentricity, the ratio between the diameter of the coupling gear wheel 325 and the diameter of the gear 323 of the protective tube, the number of gear teeth and the like, it is possible to implement any gear ratios and thus relative rotations between the coupling gear wheel 325 and the protective sleeve 312, so that the transparent area of the protective sleeve 312, which covers the camera optical system 310, changes constantly when the camera unit 309 is rotated in the direction of recording position. By means of the eccentricity, the camera unit 309 can be rotated by approximately 245 degrees, while the protective tube 312 is rotated merely by approximately 20 degrees.

Consequently, the coupling gear wheel 325 is supported in relation to the gear 323 of the protective tube so eccentrically and meshes with the gear 323 of the protective tube in such a way that, in a rotation from rest position to recording position, the camera unit 309 is pivoting about the rotating axis 311 of the camera at a rotation angle which amounts to between 10 times and 15 times of the rotation angle with which the protective tube 312 is pivoting about the rotating axis 311 of the camera. The eccentric movement of the coupling gear wheel 325 can be supported by pins (not shown in the drawings), which roll in internal rings 329 (see FIG. 40) of the coupling gear wheel 325. These pins are molded to the camera unit 309 and extend into the internal rings 329.

As an alternative to the eccentric tooth system described above, this can also be achieved by means of a wobble drive or so-called harmonic drive.

However, the problem of eccentric support involves that the protective tube 312 would be returned at the same rotation angle when the camera unit 308 is retracted. According to the present invention, the problem of a resetting rotation is solved by using a free wheel device 330, which is shown for different embodiments in FIGS. 42a to 42c, FIGS. 43a to 43c, and FIGS. 44a to 44c. When the camera unit 309 is rotated in the direction of rest position, this free wheel device 330 prevents the protective tube 312 from rotating. At the same time, the freewheel device 330 is designed as a separate component, which is inserted in the protective tube 312 and arranged between an internal tooth system 331 of the protective tube 312 and the coupling gear wheel 325 attached to the mounting attachment 327 of the camera unit 309. The freewheel device 330 is designed with the above-mentioned gear 323 of the protective tube and now also with a coupling element 332 or 332' or 33" which, when rotating in the direction of recording position, meshes with the internal tooth system 331 of the protective tube 312 and, when rotating in the direction of rest position, it is disengaged from the internal tooth system 331 of the protective tube 312. As a result, the freewheel device 330 features the coupling element 332, 332', 332" at its axial end facing the internal tooth system 331 of the protective sleeve, whereas the coupling element 332, 332', 332" with the internal tooth system 324 of the gear 323 of the protective tube, which meshes with the coupling gear wheel 325, is designed at the axial end facing the coupling gear wheel 325.

Figure 42A:
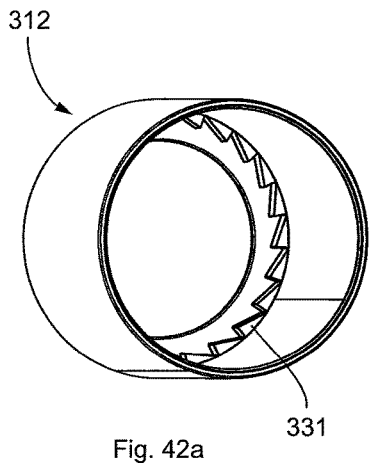
FIG. 42a is a perspective view on a protective tube with an internal tooth system.
Figure 42B:
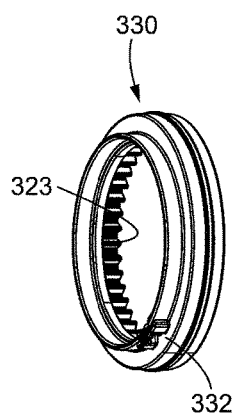
FIG. 42b is a perspective view on a freewheel device.
Figure 42C:
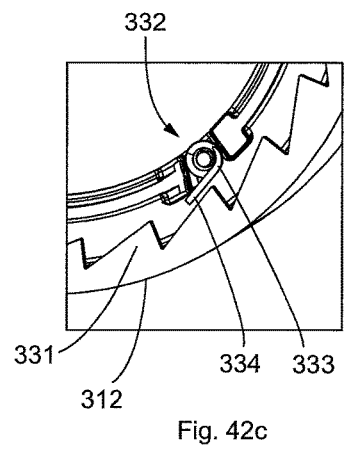
FIG. 42c is a perspective detailed view of the freewheel device shown in FIG. 9b.

According to a first embodiment of the coupling element 332, which is shown in FIGS. 42a to 42c, the coupling element 332 is designed in the form of at least one retaining spring 333 having a retaining spring arm 334, wherein the retaining spring arm 334 is spring tensioned and arranged in such a way that, when rotating in the direction of recording position, it is engaged with the internal tooth system 331 of the protective tube 312 and, when rotating in the direction of rest position, it slides off the internal tooth system 331 of the protective tube 312. Naturally, the other arm of the retaining spring 333 is supported at the freewheel device 330. The internal tooth system 331 of the protective tube 312 is designed accordingly, wherein each tooth of the internal tooth system 331 shows in cross section the form of an irregular triangle. When rotating in the direction of recording position, the retaining spring arm 334 is attached to a tooth of the internal tooth system 331, so that the freewheel device 330 is connected in torque-proof manner with the internal tooth system 331 of the protective tube, and the protective tube and the freewheel device 330 are rotating together and are connected in torque-proof manner with the camera unit via the gear 323 of the protective tube. However, when rotating in the direction of rest position, the teeth of the internal tooth system 331 of the protective tube 312 push the retaining spring 333 out of its movement path, wherein they deflect the retaining spring arm 334 against the force of the retaining spring.

Figure 43A:
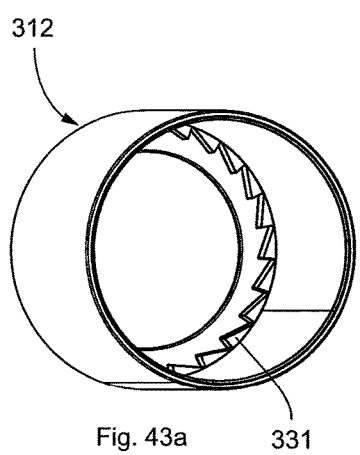
FIG. 43a is a perspective view on a protective tube with an internal tooth system.
Figure 43B:
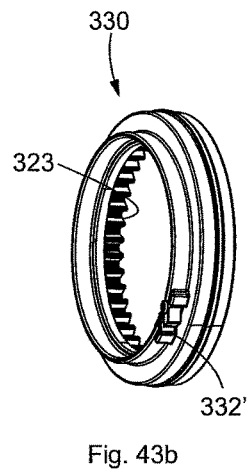
FIG. 43b is a perspective view on a freewheel device according to an alternate embodiment.
Figure 43C:
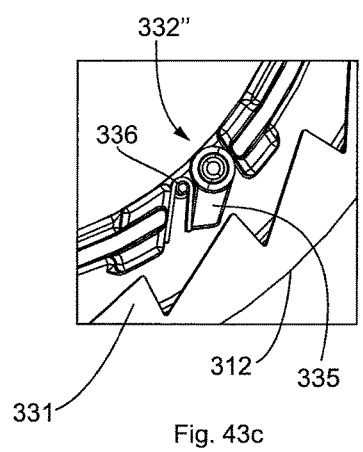
FIG. 43c is a perspective detailed view on the freewheel device shown in FIG. 10b.

The second embodiment of a coupling element 332' is shown in FIGS. 43a to 43c and resembles the operating mode of the first embodiment of the coupling device 332, so that it is not required to repeat the description but, instead, reference can be made to the preceding embodiments. The coupling element 332' according to the second embodiment is designed in the form of at least one locking pawl 335. The locking pawl 335 is pretensioned by means of a pawl spring element 336 in such a way that the locking pawl 335 engages with the internal tooth system 331 of the protective tube 312, when rotating in the direction of recording position, and that it slides off the internal tooth system 331 of the protective tube 312, when rotating in the direction of rest position. When rotating to recording position, the locking pawl 335 forms a form-fit and thus torque-proof connection with a tooth of the internal tooth system 331 of the protective tube 312, so that the protective tube 312 is carried along. In all embodiments of FIGS. 42a to 44c, the protective tube is rotated simultaneously via the camera unit 309, the coupling gear heel 325 and the coupling element.

Figure 44A:
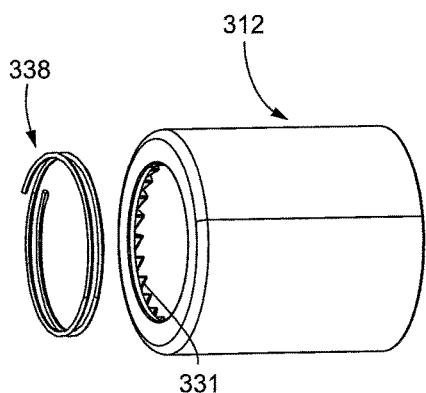
FIG. 44a is a perspective view on a protective tube with an internal tooth system.
Figure 44B:
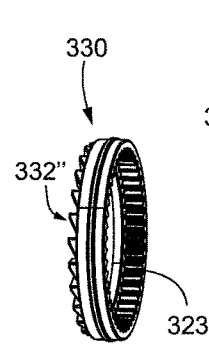
FIG. 44b is a perspective view on a freewheel device according to a further alternative embodiment.
Figure 44C:
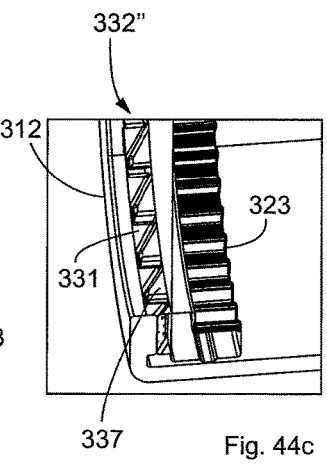
FIG. 44c is a perspective detailed view of the freewheel device shown in FIG. 11b.

FIGS. 44a to 44c show a third embodiment of a coupling element 332". This coupling element 332" is designed in the form of an external tooth system 337, wherein the external tooth system 337 engages with the internal tooth system 331 of the protective tube 312 when rotating in the direction to recording position, and slides off from the internal tooth system 331 of the protective tube 312, when rotating in the direction of rest position. Furthermore, because of the fact that the sliding process implies an axial movement between the protective tube 312 and the freewheel device 330 (because the fact that the teeth slide off from each other could result in mechanical and permanent deformation), it has been provided that the protective tube 312 can be moved by means of a spring element 338 in the direction of the rotating axis 311 of the camera, so that, when rotating in the direction of rest position, the coupling element " can be moved in relation to the protective tube 312 in such a way that, when rotating in the direction of rest position, the external tooth system 337 can slide off the internal tooth system 331 of the protective tube 312. At the same time, the spring element 338 is arranged between the cradle for camera optical systeming the swivel arm 314a, which is designed for the camera module 307 and shaped in the form of an ear, and the protective tube 312, thus allowing the internal tooth system 331 of the protective tube 312 to evade axially the external tooth system 337 of the coupling element 332". However, when rotating in opposite rotational direction, the internal tooth system 331 and the external tooth system 337 form a torque-proof connection.

As an alternative for the embodiments of a freewheel device described above, the freewheel device can also be designed in the form of a freewheel clutch or in the form of a roller freewheel.

Identical reference numerals used in FIGS. 19 to 24 refer to the respective identical or same element or components.

The preceding description involving FIGS. 34 to 44c describes a camera system 303 for a motor vehicle 301, which comprises the carrier housing 304 arranged at the movable vehicle component 302, or the hatchback 302, of the motor vehicle, and the camera module 307 coupled in movable fashion with the carrier housing 304, which includes the drive unit 308 and the camera unit 309 with the camera optical system 310. By means of the drive unit 308, the camera unit 309 can be adjusted within a control range and mounted in the carrier housing 304 to be pivoted about the camera axis. In addition, the camera unit 309 is designed to be pivoted within the control range at least between rest position and recording position, which can be variably adjusted, depending on the surrounding area of the motor vehicle to be detected. The transparent protective tube 312 of the camera optical system 310 is surrounding the camera unit. When rotating the camera unit 309 by approximately 245 degrees, the protective tube 312 is rotated merely by approximately 20 degrees. To avoid that the protective tube 312 is rotated back by the same rotation angle when the camera is retracted, a freewheel device 330 has been provided, so that the protective tube 312 can be rotated only in one direction, the direction of recording position, and when retracted, i.e., when the camera unit 309 is rotated back, it is locked. By means of the invention-based protective tube 312, the camera optical system 310 of the camera unit 309 is protected against stress, as long as the positions of the protective tube 312 change with each actuation of the camera unit 309. According to the embodiments described, the protective tube 312 made a complete rotation with twenty camera actuations. In addition, during the retracting process, the protective tube 312 is cleaned by the sealing lip 322 of the carrier housing 312.

An expert is able to recognize that the embodiments shown in FIGS. 34 to 44c can be transferred also to the embodiments of the rear view camera system shown in FIGS. 1 to 33, and vice versa.

The invention described above is certainly not restricted to the embodiments described and shown. Obviously, the embodiments shown in the figures can be modified in numerous ways according to the use intended by the expert, without leaving the scope of the invention. The invention involves everything included in the description and/or shown in the drawings, including everything that may be different from the concrete embodiments but obvious to an expert.

The invention claimed is:

1. A rear view camera system for a motor vehicle, comprising:
    a carrier assembly, which is arranged at a movable vehicle component of a motor vehicle,
        a camera optical system, which is coupled to be moved with the carrier assembly, and
        a drive unit, which is coupled with the camera optical system, so that the camera optical system is designed to be moved into a rest position, in which it is arranged in a recess of the carrier assembly, and a recording position, in which a surrounding area of the motor vehicle can be detected,
    wherein the camera optical system is pivoted in relation to the carrier assembly about an adjustable axis, which is coupled with the drive unit, and is adapted to be moved about the adjustable axis between the rest position and the recording position, which can be adjusted in variable manner, depending on the surrounding areas to be recorded, and
    wherein an eccentric component is coupled in movable fashion with the adjustable axis, which eccentric component comprises an outer peripheral region with an increasing radial distance in relation to the adjustable axis, wherein the outer peripheral region of the eccentric component rests on a support element of the carrier assembly, so that a rotation of the eccentric component changes the distance between the adjustable axis and the support element in such a way that the camera optical system can be moved to a recording position in which the camera optical system protrudes from the recess of the carrier assembly.

2. A rear view camera system according to claim 1, further comprising an impact protection member, which allows the camera optical system to perform an evasive movement from the recording position, in which the camera optical system protrudes from the recess, back into the recess of the carrier assembly, wherein the evasive movement is performed against an evasive force exerted by the impact protection member.

3. A rear view camera system according to claim 2, wherein the camera optical system is spring-mounted via the impact protection to the carrier assembly.

4. A rear view camera system according to claim 2, wherein the support element has a bar-like design and the impact protection is designed in the form of an elastic pressure spring, wherein the bar-like support element, which is supported at the elastic pressure spring as attachment for the eccentric component, can be shifted against the evasive force of the elastic pressure spring in relation to the carrier assembly in such a way that the camera optical system can be moved into the recess of the carrier assembly.

5. A rear view camera system according to claim 4, wherein the bar-like support element is incorporated in a guide of the carrier assembly in which the bar-like support element is retained and can shifted via the elastic pressure spring.

6. A rear view camera system according to claim 2, wherein the support element has a bar-like and elastically deformable design and acts as the impact protection member, wherein the eccentric component can be shifted against the evasive force of the elastically deformable support element in relation to the carrier assembly in such a way that, under the elastic deformation of the support element, the camera optical system can be moved into the recess of the carrier assembly.

7. A rear view camera system according to claim 2, wherein the support element is elastically coupled with the carrier assembly, so that the support element can be moved and/or elastically deformed in relation to the carrier assembly by overcoming the evasive force of the impact protection member.

8. A rear view camera system according to claim 2, wherein the eccentric component has at least one elastically deformable outer peripheral region, wherein the eccentric component involves the impact protection member and can be shifted in relation to the carrier assembly in such a way that, under elastic deformation of the at least one elastically deformable outer peripheral region, the camera optical system can be moved into the recess of the carrier assembly.

9. A rear view camera system according to claim 8, wherein the eccentric component is designed in the form of a plastic component, forming one piece with the housing of the camera optical system.

10. A rear view camera system according to claim 8, wherein the impact protection member has a two-part design, consisting of a metal spring element and the housing of the camera optical system, wherein the spring element is attached to the housing of the camera optical system and has an outer peripheral region, which is supported on the support element of the carrier assembly when the camera optical system moves to recording position.

11. A rear view camera system according to claim 2, wherein the adjustable axis is coupled by means of at least one swivel arm with the carrier assembly, wherein via the adjustable axis and the at least one swivel arm the camera optical system can be pivoted in relation to the carrier assembly to recording position, in which the camera optical system protrudes from the recess of the carrier assembly.

12. A rear view camera system according to claim 11, wherein the at least one swivel arm is pretensioned with an elastic resetting member against the carrier assembly in such a way that the at least one swivel arm and the camera optical system can be lowered into a recess of the carrier assembly.

13. A rear view camera system according to claim 12, wherein the evasive force of the impact protection member is greater than the resetting force of the elastic resetting member of the at least one swivel arm.

14. A rear view camera system for motor vehicles, comprising camera optical system, which is coupled in movable fashion with a carrier assembly, wherein a drive unit is coupled with the camera optical system and the drive unit is coupled with a control unit, so that the camera optical system can be adjusted in relation to the carrier assembly with the control of the control unit within an adjustment range,
wherein the carrier assembly is arranged at a movable vehicle component,
wherein, within the adjustment range, the camera optical system has at least two recording positions, in which the camera optical system captures recordings from its respective visual field outside of the vehicle,
wherein a position detecting device is provided, which captures the position of the movable vehicle component, wherein the control unit is coupled with the position detecting device and the camera optical system's position information from the position detecting device and controls the drive unit, depending on the position information of the camera optical system, thus, depending on the position information, bringing the camera optical system into a recording position associated with the position information,
wherein the camera optical system is arranged in the carrier assembly in such a way that the camera optical system can be pivoted in relation to the carrier assembly,
wherein the camera optical system is coupled with the carrier assembly to be rotated about an adjustable axis via at least one swivel arm, wherein the adjustable axis can be pivoted in relation to the carrier assembly via the swivel arm,
wherein an electric rotating motor is also arranged in the adjustable axis as a component of the drive unit of the camera optical system, so that the shaft of the rotating motor is located in the adjustable axis of the camera optical system, and the rotating motor together with the camera optical system can be pivoted with the swivel arm, and
wherein in addition to the camera optical system, the motor shaft is also coupled with an eccentric component which is supported on a support element of the carrier assembly and comprises an outer peripheral region with an increasing radial distance in relation to the adjustable axis, wherein the outer peripheral region of the eccentric component rests on the support element of the carrier assembly, so that depending on the rotation angle, a rotation of the eccentric component also changes the distance between the eccentric component, and thus the shaft, and the camera optical system in relation to the support element.

15. A rear view camera system according to claim 14, wherein the position detecting device involves a micro switch or Hall sensor, which monitors the position of the movable vehicle components.

16. A rear view camera system according to claim 14, wherein the position detecting device includes a position sensor, which is arranged in the carrier assembly.

17. A rear view camera system according to claim 16, wherein the position detecting device comprises at least one acceleration sensor or a gyroscopic sensor.

18. A rear view camera system according to claim 14, wherein the at least one swivel arm is pretensioned with an elastic resetting member against the carrier assembly in such a way that the at least one swivel arm and the camera optical system can be attached to the carrier assembly and lowered into a recess of the carrier assembly.

19. A rear view camera system according to claim 14, wherein the support element is elastically coupled with the carrier assembly, so that the support element can be moved in relation to the carrier assembly by overcoming a resilient supporting force.

20. A camera system for a motor vehicle, comprising:
a carrier housing, which is arranged at a movable vehicle component of the motor vehicle, and
a camera module, which is coupled in movable fashion with the carrier assembly and which comprises a drive unit and a camera unit with a camera optical system,
wherein the camera unit can be adjusted within an adjustment range via the drive unit,
wherein the camera unit is pivoted about a rotating axis of the camera in the carrier housing, and it is pivoted within the control range between at least one rest position and one recording position, which can be variably adjusted depending on a surrounding area of the vehicle to be recorded, wherein the camera unit is surrounded by a protective tube, which is transparent for the camera optical system,
wherein the protective tube can be rotated in relation to the camera unit,
wherein the protective tube is coupled to be moved with the drive unit via the camera unit,
wherein the protective tube includes a gear with an internal tooth system, wherein the camera unit is connected in a torque-proof manner with a coupling gear wheel, which meshes with the internal tooth system of the gear of the protective tube, and
wherein the camera module further comprises a freewheel device, which prevents a rotation of the protective tube, when the camera unit is rotated in the direction of the at least one rest position.

21. A camera system according to claim 20, wherein the protective tube is pivoted about the rotating axis of the camera and coupled to be moved with the drive unit in such a way that the protective tube can be pivoted about the rotating axis of the camera.

22. A camera system according to claim 20, wherein the camera unit has a mounting attachment, on which the coupling gear wheel is attached in torque-proof manner and which supports the coupling gear wheel eccentrically to the rotating axis of the camera and the gear of the protective tube.

23. A camera system according to claim 20, wherein the coupling gear wheel is supported in relation to the gear of the protective tube so eccentrically and meshes with the gear of the protective tube in such a way that, in a rotation from rest position to recording position, the camera unit is pivoting about the rotating axis of the camera at a rotation angle which amounts to between ten and fifteen times the rotation angle with which the protective tube is pivoting about the rotating axis of the camera.

24. A camera system according to claim 20, wherein the protective tube is provided with an internal tooth system and the freewheel device with the gear of the protective tube and a coupling element which, when rotated in the direction of recording position, meshes with the internal tooth system of the protective tube and, when rotating in the direction of rest position, it is disengaged from the internal tooth system of the protective tube.

25. A camera system according to claim 24, wherein the coupling element is designed in the form of at least one retaining spring having a retaining spring arm, wherein the retaining spring arm is spring tensioned and arranged in such a way that, when rotating in the direction of recording position, it is engaged with the internal tooth system of the protective tube and, when rotating in the direction of rest position, it slides off the internal tooth system of the protective tube.

26. A camera system according to claim 24, wherein the coupling element is designed at least in the form of a locking pawl, which is pretensioned via a pawl spring element in such a way that the locking pawl engages with the internal tooth system of the protective tube, when rotating in the direction of recording position, and that it slides off the internal tooth system of the protective tube, when rotating in the direction of rest position.

27. A camera system according to claim 24, wherein the coupling element is designed in the form of an external tooth system, wherein, when rotating in the direction of recording position, the external tooth system engages with the internal tooth system of the protective tube and, when rotating in the direction of rest position, it slides off the internal tooth system of the protective tube.

28. A camera system according to claim 27, wherein the protective tube can be moved via a spring element in the direction of the rotating axis of the camera, so that, when rotating in the direction of rest position, the coupling element can be moved in relation to the protective tube in such a way that, when rotating in the direction of rest position, the external tooth system can slide on top of the internal tooth system of the protective tube.

29. A camera system according to claim 20, wherein the camera module is coupled via at least one swivel arm with the carrier housing, wherein the camera module together with the rotating axis of the camera can be pivoted by the at least one swivel arm in relation to the carrier housing.

30. A camera system according to claim 20, wherein the protective tube is attached to a sealing lip, which cleans the protective tube when rotating in the direction of recording.

* * * * *